(12) United States Patent
Hattori et al.

(10) Patent No.: US 7,349,575 B2
(45) Date of Patent: Mar. 25, 2008

(54) PATTERN INSPECTION METHOD AND APPARATUS, AND PATTERN ALIGNMENT METHOD

(75) Inventors: Shinichi Hattori, Tokyo (JP); Tohru Ida, Tokyo (JP); Shuzo Matsuno, Tokyo (JP)

(73) Assignee: Nippon Avionics Co., Ltd., Tokyo (JP)

( * ) Notice: Subject to any disclaimer, the term of this patent is extended or adjusted under 35 U.S.C. 154(b) by 756 days.

(21) Appl. No.: 10/872,035

(22) Filed: Jun. 18, 2004

(65) Prior Publication Data

US 2004/0264759 A1  Dec. 30, 2004

(30) Foreign Application Priority Data

| Jun. 27, 2003 | (JP) | ............................. 2003-184876 |
| Jul. 11, 2003 | (JP) | ............................. 2003-195796 |
| Jul. 28, 2003 | (JP) | ............................. 2003-202285 |

(51) Int. Cl.
*G06K 9/00* (2006.01)

(52) U.S. Cl. ...................... 382/184; 382/149; 382/172; 382/274; 356/394; 356/237.4

(58) Field of Classification Search ................ 382/141, 382/145, 149, 144, 168, 181, 190, 203, 204, 382/184, 172, 274, 257, 252, 270, 232; 358/3.03, 358/1.9, 466, 465, 462, 518, 448; 356/237.4, 356/237.1, 237.2, 237.3, 394; 348/86, 87, 348/126, 128, 125; 369/116; 250/310, 559.03, 250/492.3, 307, 305, 306; 438/14, 16
See application file for complete search history.

(56) References Cited

U.S. PATENT DOCUMENTS 4,570,180 A * 2/1986 Baier et al. .................. 382/145

| 5,315,409 A | * | 5/1994 | Matsumura et al. | ........ 382/172 |
| 6,452,677 B1 | * | 9/2002 | Do et al. | .................... 356/394 |
| 6,952,492 B2 | * | 10/2005 | Tanaka et al. | .............. 382/149 |

FOREIGN PATENT DOCUMENTS

| JP | 02-162205 |   | 6/1990 |
| JP | 02-162205 | A | 6/1990 |
| JP | 04-354066 |   | 12/1992 |
| JP | 05-248836 | A | 9/1993 |
| JP | 06-273132 | A | 9/1994 |
| JP | 07-110863 | A | 4/1995 |
| JP | 10-141930 | A | 5/1998 |

(Continued)

*Primary Examiner*—Sheela Chawan
(74) *Attorney, Agent, or Firm*—Blakely, Sokoloff, Taylor & Zafman

(57) ABSTRACT

In a pattern inspection method, a master pattern serving as a reference and the continuous tone image of a pattern to be measured that is sensed by a camera are aligned. At least the position of a base in the continuous tone image of the pattern to be measured is detected on the basis of the master pattern. At least one threshold is set on the basis of the difference from at least the density value of the base. The continuous tone image of the pattern to be measured is binarized on the basis of the set threshold. The pattern to be measured is inspected by comparing the binarized pattern to be measured and the master pattern. A pattern inspection apparatus and alignment method are also disclosed.

4 Claims, 18 Drawing Sheets

FOREIGN PATENT DOCUMENTS

| | | |
|---|---|---|
| JP | 10-293847 | 11/1998 |
| JP | 10-293847 A | 11/1998 |
| JP | 10-318713 A | 12/1998 |
| JP | 2000-140920 A | 5/2000 |
| JP | 2001-036744 | 2/2001 |

* cited by examiner

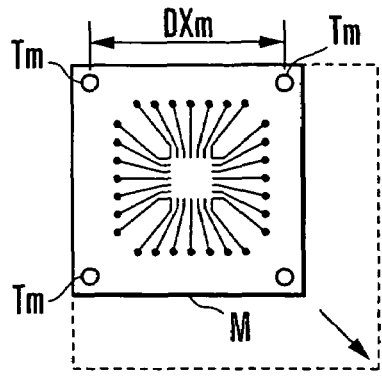
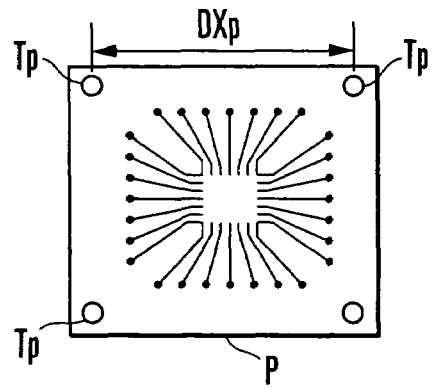
FIG.3A  FIG.3B
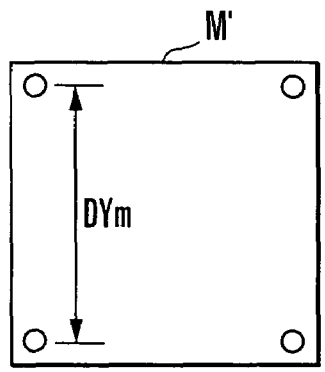
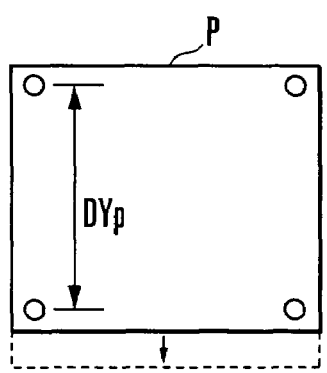
FIG.3C  FIG.3D
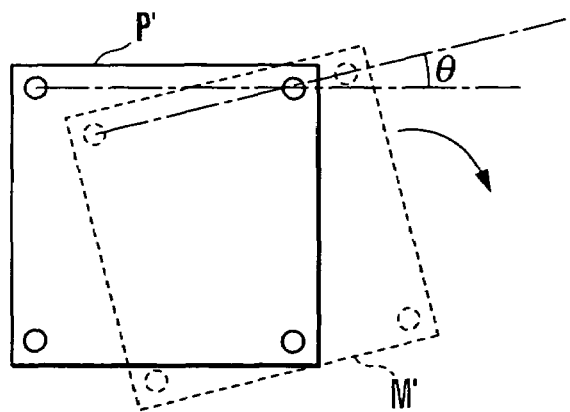
FIG.3E

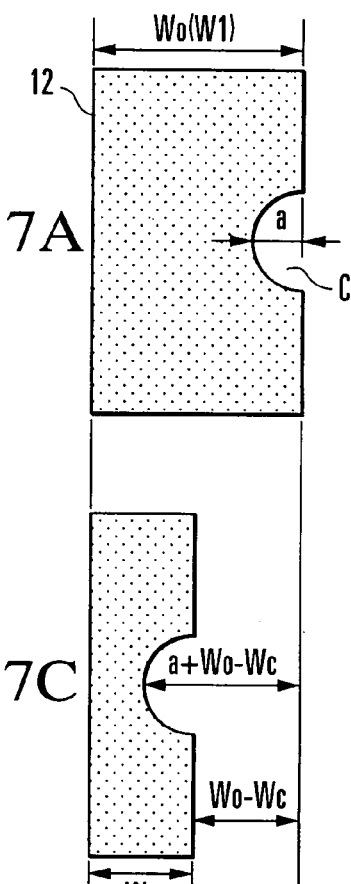
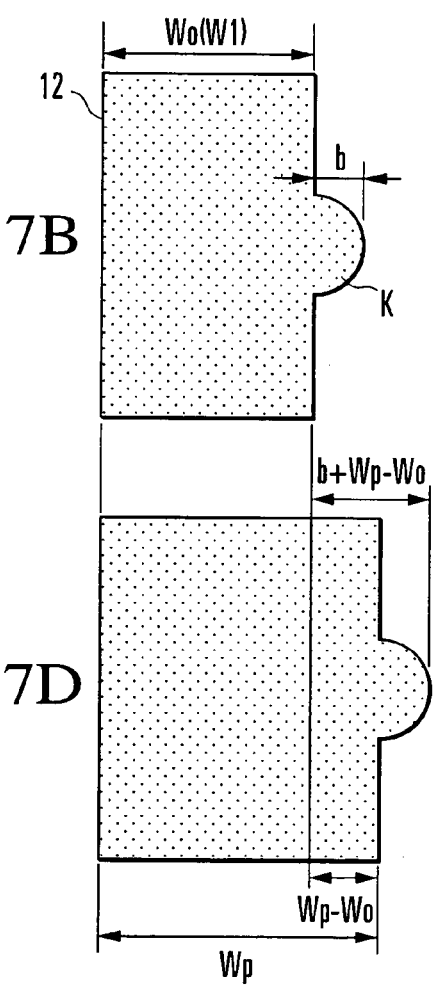
FIG.17A  FIG.17B
FIG.17C  FIG.17D

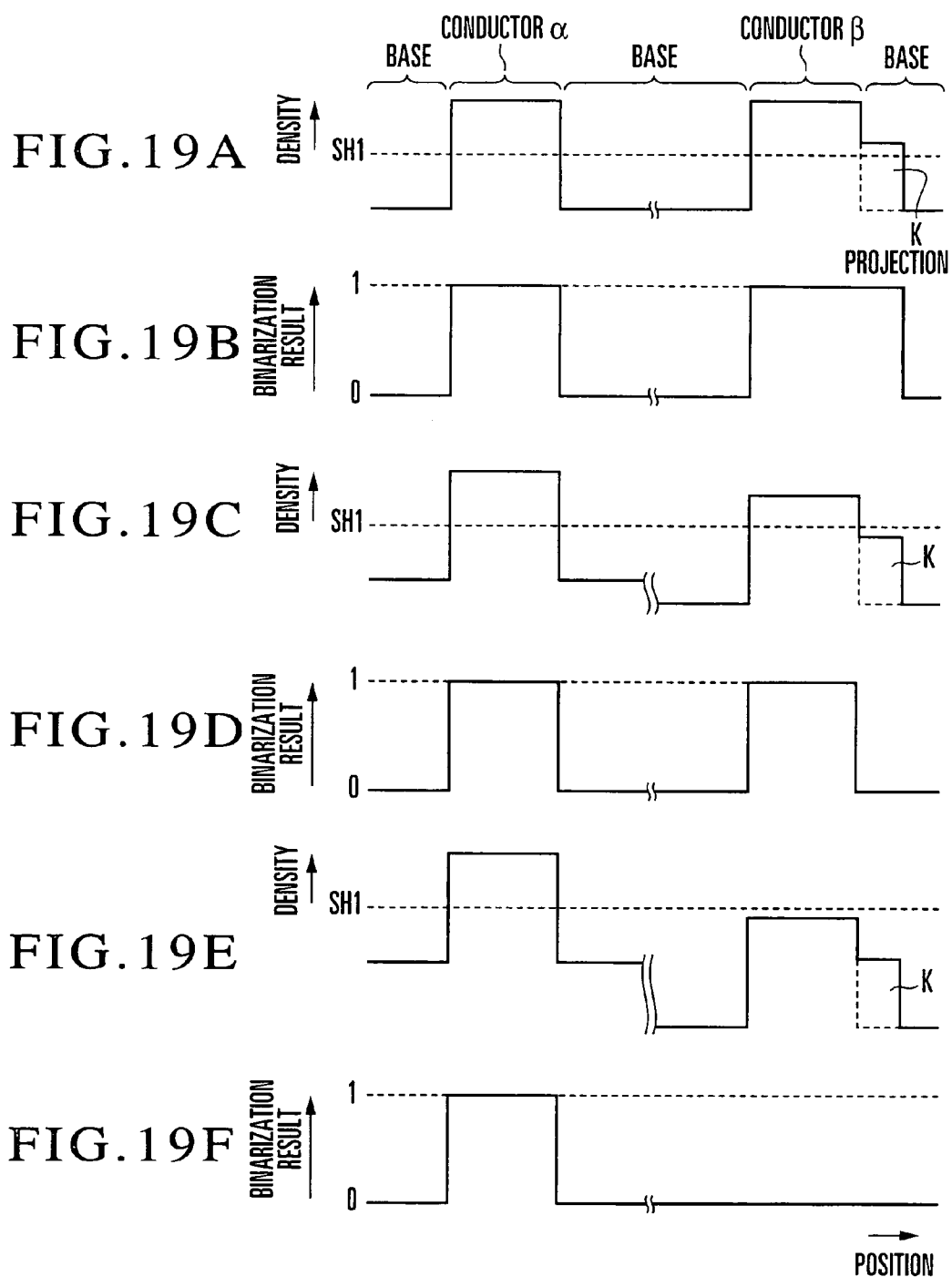

PATTERN INSPECTION METHOD AND APPARATUS, AND PATTERN ALIGNMENT METHOD

BACKGROUND OF THE INVENTION

The present invention relates to a pattern inspection method and apparatus which inspect a pattern formed on a green sheet, film carrier, or the like, and an alignment method which aligns a master pattern and a pattern to be measured.

PGA (Pin Grid Array) has conventionally been known as a packaging technique which meets a demand for multipin ICs and LSIs. The PGA adopts a ceramic substrate as the base of a package for attaching a chip, and wiring lines are formed to lead wire extraction positions. Formation of the ceramic substrate uses a so-called green sheet prepared by kneading an alumina powder with a liquid binder into a sheet. A paste containing a refractory metal is screen-printed onto the green sheet. The sheet is baked to sinter the green sheet and metalize the paste, which is called co-firing.

Another packaging technique is TAB (Tape Automated Bonding). According to TAB, a copper foil pattern formed on a polyimide tape carrier (TAB tape) is bonded to the electrodes of an IC chip to form external leads. The copper foil pattern is formed by adhering a copper foil to a tape carrier with an adhesive and etching the foil.

Such green sheet or tape carrier undergoes visual pattern inspection by the operator with a microscope after pattern formation. However, visual inspection of a fine pattern requires a skilled operator and hard use of the eye. As an alternative to visual inspection, there has been proposed a pattern inspection method of sensing a pattern formed on a tape carrier or the like with a TV camera and automatically inspecting the pattern (see, e.g., Japanese Patent Laid Open No. 7-110863). According to this pattern inspection method, the continuous tone image of a pattern to be measured that is sensed by the camera is binarized. The binarized pattern is inspected by comparing it with a master pattern serving as a reference.

Continuous tone image data of the pattern to be measured includes a pattern (conductor such as a copper foil pattern) and a background (base such as a green sheet bearing the conductor). In general, the conductor and base have a density difference. When a density histogram representing the density frequency of image data is created, the histogram exhibits a bimodal characteristic having two maximum values: a frequency corresponding to the base and a frequency corresponding to the conductor. To binarize continuous tone image data, the threshold is set to a valley point between the two crests.

Continuous tone image data of a pattern to be measured contains density variations due to the inclination of the work surface with respect to the camera and a change over time in illumination light quantity. If a continuous tone image containing density variations is binarized at a predetermined threshold, a defect such as a conductor deficit or disconnection which should be converted into a value "0" representing the base is converted into a value "1" representing the conductor, or a defect such as a projection or short circuit which should be converted into the value "1" representing the conductor is converted into the value "0" representing the base. When the density greatly varies, a part of the base that should be converted into "0" is converted into "1", or a part of the conductor that should be converted into "1" is converted into "0".

When continuous tone image data in which a conductor α is free from any defect and a conductor β has a deficit C is binarized at a threshold SH1, as shown in FIG. 18A, the conductor β becomes thin by the deficit C, as shown in FIG. 18B. The deficit C can be detected by comparing the binarization result of FIG. 18B with a master pattern.

However, if large density variations exist near the conductor β and the density becomes higher than that at the position of the conductor α (FIG. 18C), the deficit C of the conductor β cannot be detected because the deficit C which should be converted into "0" is converted into "1", as shown in FIG. 18D, even if continuous tone image data is binarized at the threshold SH1. If density variations in FIG. 18C are very large (FIG. 18E), the base and deficit C which should be converted into "0" are converted into "1", as shown in FIG. 18F.

When continuous tone image data (FIG. 19A) in which the conductor β has a projection K is binarized at the threshold SH1, the conductor β becomes thick by the projection K, as shown in FIG. 19B. The projection K can be detected by comparing the binarization result of FIG. 19B with a master pattern.

However, if large density variations exist near the conductor β and the density becomes lower than that at the position of the conductor α (FIG. 19C), the projection K of the conductor β cannot be detected because the projection K which should be converted into "1" is converted into "0", as shown in FIG. 19D, even if continuous tone image data is binarized at the threshold SH1. If density variations in FIG. 19C are very large (FIG. 19E), the conductor and projection K which should be converted into "1" are converted into "0", as shown in FIG. 19F.

In order to eliminate the influence of density variations and the like present in continuous tone image data of a pattern to be measured, a technique of optimizing the threshold has been proposed (see, e.g., Japanese Patent Laid-Open No. 2-162205 and Japanese Patent Laid-Open No. 5-248836).

A pattern inspection apparatus disclosed in Japanese Patent Laid-Open No. 2-162205 extracts the density value of a base from the continuous tone image of a pattern to be measured. A level shifted from the density value of the base by a predetermined value is defined as a binarization threshold. A pattern inspection apparatus disclosed in Japanese Patent Laid-Open No. 5-248836 samples and holds a density value when the continuous tone image of a pattern to be measured changes from the base level to the conductor level. A value calculated by adding a predetermined offset to the sampled/held value is defined as a threshold.

However, the pattern inspection apparatuses disclosed in Japanese Patent Laid-Open No. 2-162205 and Japanese Patent Laid-Open No. 5-248836 suffer a complicated optical system. This is because these pattern inspection apparatuses adopt an optical detection means in addition to an image sensing means for sensing a pattern to be measured and outputting continuous tone image data. A two-dimensional pattern signal output from the optical detection means is binarized at a fixed threshold, and the density value of the base is extracted from the continuous tone image data by using the binarized two-dimensional pattern signal as a gate signal. Also, the circuits of the pattern inspection apparatus are complicated because these apparatuses require a threshold setting circuit and binarization circuit for binarizing a two-dimensional pattern signal, in addition to a threshold setting circuit and binarization circuit for binarizing continuous tone image data.

According to a conventional threshold setting method, a defect such as the projection or deficit of a pattern to be measured may be converted into an erroneous value, and a defect of the pattern to be measured may be missed. As shown in FIG. 20, the density value of a deficit portion or disconnection portion is higher than that of the base and close to that of the conductor. To the contrary, the density value of a projection portion or short circuit portion is lower than that of the conductor and close to that of the base. For this reason, binarization using a binarization threshold SH11 converts a defect such as a deficit, pinhole, or disconnection into "1", and a defect such as a projection, scattering, or short circuit into "0". Even if inspection is executed for the binarization result of FIG. 20, such defect cannot be detected.

There has also been proposed a pattern inspection method of setting, as shown in FIG. 21, a value between the density value of a conductor and that of a deficit or disconnection as a binarization threshold SH12, setting a value between the density value of a projection or short circuit and that of a base as a binarization threshold SH13, and comparing a master pattern and a pattern to be measured that is binarized on the basis of the binarization thresholds SH12 and SH13 (see, e.g., Japanese Patent Laid-Open No. 10-293847). When the pattern to be measured is binarized on the basis of the binarization threshold SH12, a defect such as a deficit, pinhole, or disconnection is converted into the value "0" representing the base, as shown in FIG. 21. A defect such as a deficit, pinhole, or disconnection can be accurately detected by performing inspection for the binarized pattern to be measured. When the pattern to be measured is binarized on the basis of the binarization threshold SH13, a defect such as a projection, scattering, or short circuit is converted into the value "1" representing the conductor, as shown in FIG. 21. A defect such as a projection, scattering, or short circuit can be accurately detected by performing inspection for the binarized pattern to be measured.

A conductor 12 formed on a base 11 of an inspection work actually has a trapezoidal sectional shape whose side wall is inclined, as shown in FIG. 22. A line width Wc of the conductor 12 at a height corresponding to the binarization threshold SH12 and a line width Wp of the conductor 12 at a height corresponding to the binarization threshold SH13 are different from a line width Wo of the conductor 12 at a height corresponding to the binarization threshold SH11.

The conventional pattern inspection method determines an inspection threshold on the assumption that a pattern to be measured is binarized on the basis of the binarization threshold SH11. If a pattern to be measured that has been binarized on the basis of the binarization thresholds SH12 and SH13 is inspected, the inspection is influenced by the difference between the line widths Wc and Wp and the line width Wo. A pattern to be measured that is originally nondefective may be detected as a defect, or a defective pattern may be missed. To eliminate the influence of the sectional shape of the conductor, the operator must correct the inspection threshold in consideration of the difference in line width.

SUMMARY OF THE INVENTION

The present invention has been made to overcome the conventional drawbacks, and has as its object to provide a pattern inspection method capable of eliminating with a simple arrangement the influence of density variations present in the continuous tone image of a pattern to be measured.

It is another object of the present invention to provide a pattern inspection method and pattern inspection apparatus capable of accurately detecting a defect of a pattern to be measured, by eliminating the influence of the sectional shape of the conductor of an inspection work without correcting the inspection threshold by the operator.

To achieve the above objects, according to the present invention, there is provided a pattern inspection method comprising the alignment step of aligning a master pattern serving as a reference and a continuous tone image of a pattern to be measured that is sensed by a camera, the position detection step of detecting at least a position of a base in the continuous tone image of the pattern to be measured on the basis of the master pattern, the threshold setting step of setting at least one threshold on the basis of a difference from at least a density value of the base, the binarization step of binarizing the continuous tone image of the pattern to be measured on the basis of the set threshold, and the inspection step of inspecting the pattern to be measured by comparing the binarized pattern to be measured and the master pattern.

BRIEF DESCRIPTION OF THE DRAWINGS

FIGS. 3A to 3E are views for explaining a method of aligning a pattern to be measured and a master pattern as a whole;

FIGS. 17A to 17D are views for explaining a secondary inspection method of detecting a deficit and projection and a method of correcting a secondary inspection deficit setting value and secondary inspection projection setting value;

FIGS. 19A to 19F are charts for explaining another problem when density variations exist in continuous tone image data of the pattern to be measured;

DESCRIPTION OF THE PREFERRED EMBODIMENTS

The present invention will be described in detail below with reference to the accompanying drawings.

First Embodiment

Figure 1:
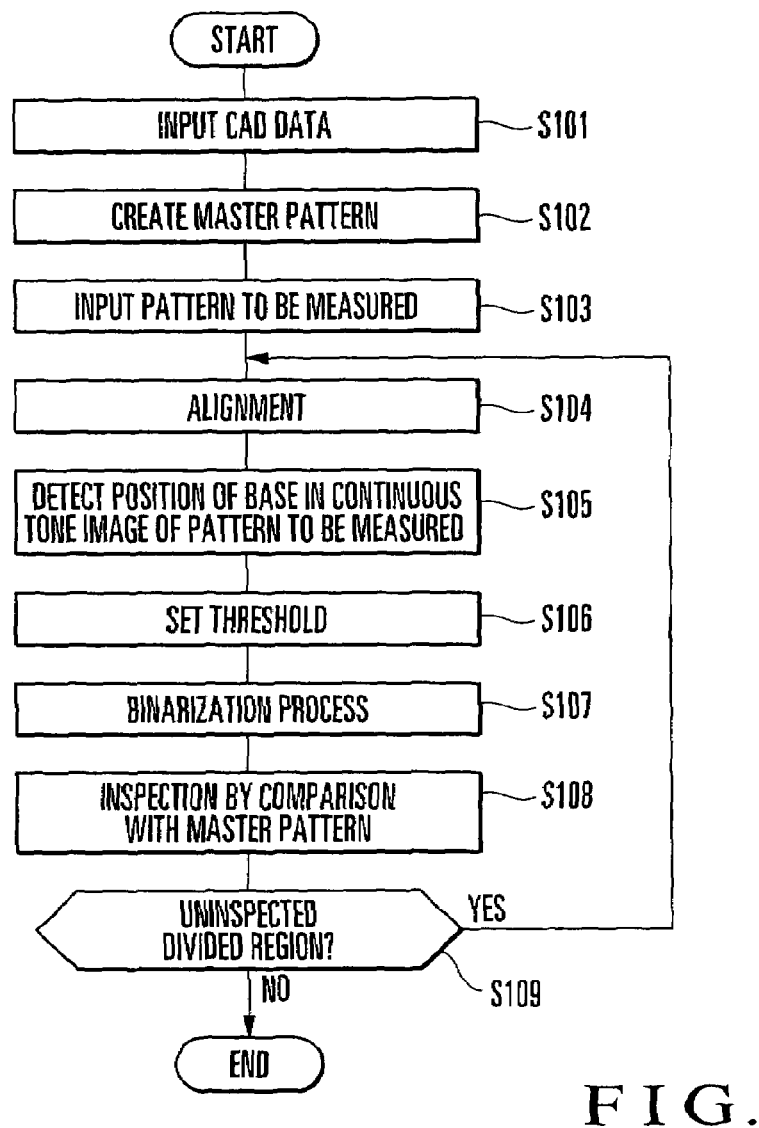
FIG. 1 is a flowchart showing a pattern inspection method according to the first embodiment of the present invention.
Figure 2:
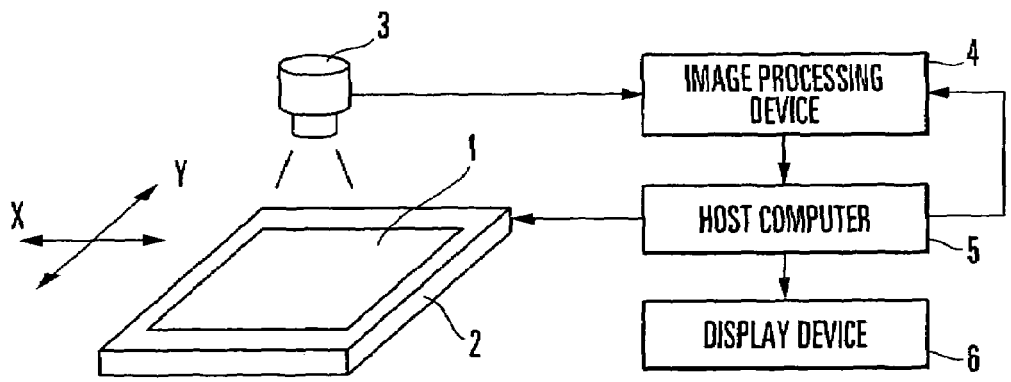
FIG. 2 is a block diagram showing a pattern inspection apparatus.

The first embodiment of the present invention will be explained in detail below with reference to the accompanying drawings. FIG. 1 shows a pattern inspection method according to the first embodiment of the present invention. FIG. 2 shows a pattern inspection apparatus used in the inspection method. In FIG. 2, reference numeral 1 denotes an inspection work such as a green sheet; 2, an X-Y table which supports the inspection work 1; 3, a line sensor camera which senses the inspection work 1; 4, an image processing device which compares a master pattern serving as a reference and a pattern to be measured that is sensed by the camera 3, and inspects the pattern to be measured; 5, a host computer which controls the whole apparatus; and 6, a display device which displays an inspection result.

The image processing device 4 comprises an alignment means for aligning a master pattern and a pattern to be measured, a binarization means for binarizing the continuous tone image of the pattern to be measured, and an inspection means for inspecting the pattern to be measured by comparing it with the master pattern. At least part of the alignment means and inspection means is implemented by a computer.

The host computer 5 comprises a position detection means for detecting the positions of a base and conductor in the continuous tone image of a pattern to be measured on the basis of a master pattern, and a threshold setting means for setting a threshold. The host computer 5 and the internal computer of the image processing device 4 can be implemented by hardware resources each having an arithmetic device, storage device, and interface, and a program which controls these hardware resources.

A master pattern which is created before inspection will be explained. The host computer 5 reads out, by a magnetic disk device (not shown), design value data (to be referred to as CAD data hereinafter) of an inspection work that is created by a CAD (Computer Aided Design) system and written in, e.g., a magnetic disk (step S101 in FIG. 1).

The host computer 5 extracts edge data of a pattern from the readout CAD data. The edge data is a set of pixels "1" representing a pattern edge. A region surrounded by pixels "1" representing a pattern edge is filled with "1", and the pattern filled with the pixels "1" (background other than the pattern is filled with "0") is defined as the first master pattern serving as an inspection reference (step S102 in FIG. 1). As described above, the first embodiment uses CAD data serving as a master for the manufacture of the inspection work 1 in order to create an accurate master pattern.

Inspection of a pattern to be measured will be explained. The inspection work 1 is sensed by the camera 3. The image processing device 4 digitizes a continuous tone image output from the camera 3, and stores the digital image in an internal image memory (not shown) (step S103). Since the camera 3 is a line sensor having pixels arrayed in the X direction, two-dimensional image data is stored in the image memory by moving the X-Y table 2 or camera 3 in the Y direction.

The image processing device 4 aligns the continuous tone image of the pattern to be measured and the first master pattern (step S104). The alignment process includes an alignment process for the pattern to be measured and the first master pattern as a whole, and an alignment process for the pattern to be measured and the first master pattern for each divided region. The whole alignment process will be explained. As shown in FIG. 3A, an alignment mark (third alignment mark) Tm is set in advance on a first master pattern M. The image processing device 4 searches a pattern P to be measured that is stored in the image memory, for a region corresponding to the alignment mark Tm, and detects an alignment mark (third alignment mark) Tp corresponding to the alignment mark Tm, as shown in FIG. 3B.

The image processing device 4 obtains distances DXp and DXm each between two alignment marks arranged in the X direction for the pattern P and first master pattern M. The distance between marks is the distance between the barycenters of two alignment marks. The image processing device 4 calculates the enlargement/reduction ratio (DXp/DXm) from the obtained inter-mark distances. The first master pattern M is enlarged or reduced in all directions so as to make the inter-mark distance of the first master pattern coincide with that of the pattern to be measured.

As shown in FIGS. 3C and 3D, the image processing device 4 obtains distances DYm and DYp each between two alignment marks arranged in the Y direction for an enlarged/reduced first master pattern M' and the pattern P. The image processing device 4 adjusts the relative speeds of the line sensor camera 3 and inspection work 1 (X-Y table 2) so as to make the inter-mark distance of the pattern to be measured coincide with that of the first master pattern. After that, the sheet 1 is sensed again. The Y image resolution is determined by the pixel size of the line sensor camera 3 and the relative speeds. By changing the moving speed of the X-Y table 2 or line sensor camera 3, the Y image resolution can be adjusted to make the inter-mark distances coincide with each other.

As shown in FIG. 3E, the image processing device 4 obtains an angle offset θ between a pattern P' and the pattern M' on the basis of the alignment mark position of the pattern P' to be measured that is obtained by image sensing and the alignment mark position of the enlarged/reduced first master pattern M'. The image processing device 4 rotates the first master pattern M' so as to eliminate the angle offset. Finally, the image processing device 4 aligns the first master pattern M' and pattern P' so as to make their mark positions coincide with each other. The whole alignment process for the pattern to be measured and the first master pattern ends.

In this manner, the distance between two alignment marks arranged in the X direction is obtained for each of the pattern to be measured and the first master pattern. The first master pattern is enlarged or reduced so that the obtained inter-mark distances coincide with each other. The distance between two alignment marks arranged in the Y direction is obtained for each of the pattern to be measured and the enlarged/reduced first master pattern. The relative speeds of the line sensor camera and pattern to be measured are adjusted so that the obtained inter-mark distances coincide with each other. The pattern to be measured is sensed again, and the angle offset between the sensed pattern and the enlarged/reduced first master pattern is obtained. The first master pattern is so rotated as to eliminate the angle offset, thereby aligning the first master pattern and the pattern to be measured. The first embodiment can set the ratio of the length (Y) and breadth (X) (aspect ratio) to 1:1 by changing the capturing speed of the camera 3 and adjusting the Y image resolution with respect to the X image resolution which is determined by the number of pixels of the line sensor camera 3.

In actual inspection, the aspect ratio may not be perfectly 1:1. For example, a pattern may be screen-printed on a green sheet while being extended in the printing direction. A pattern which is a nondefective but has an extension within an allowable range of the standards cannot attain a perfect aspect ratio of 1:1. In the first embodiment, the Y inter-mark distances are made to coincide with each other by changing the capturing speed of the camera 3. A pattern to be measured with different length and breadth scales within an allowable range can be made to coincide with the first master pattern. The pattern position can be automatically corrected upon a change in pattern position during formation.

Figure 4:
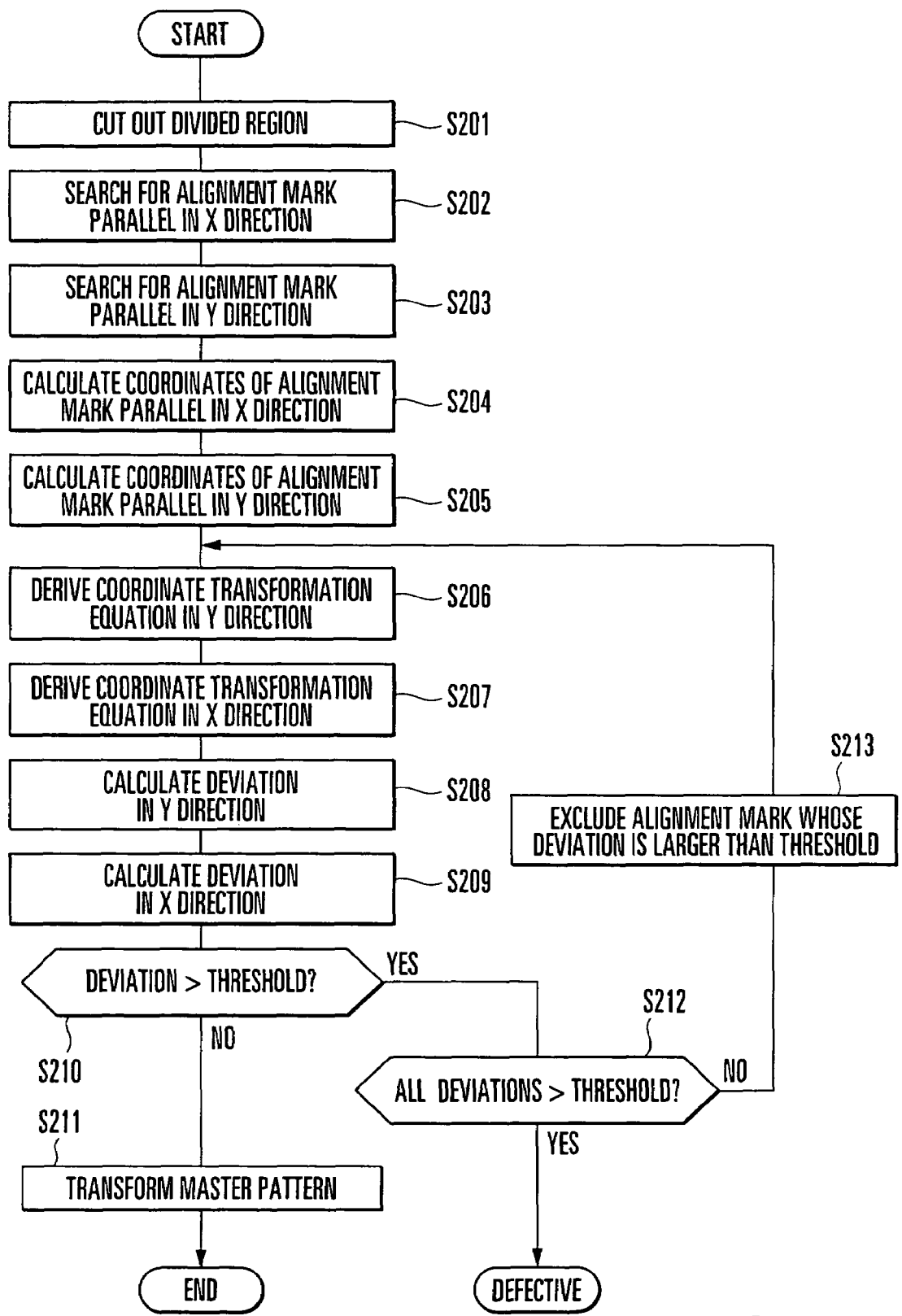
FIG. 4 is a flowchart showing a method of aligning the pattern to be measured and the master pattern for each divided region.
Figure 5A:
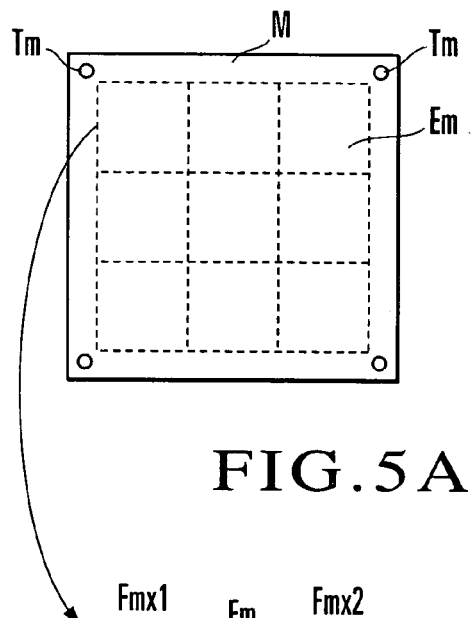
FIGS. 5A to 5D are views for explaining the method of aligning the pattern to be measured and the master pattern for each divided region.
Figure 5B:
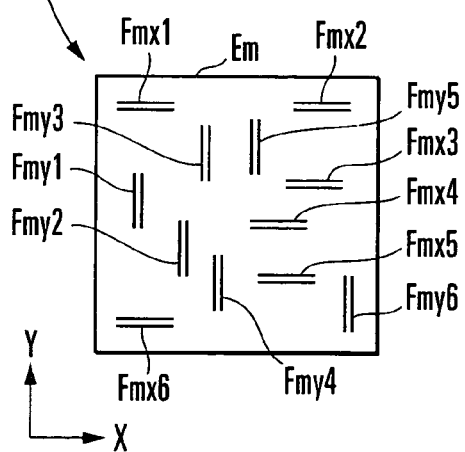

Thereafter, the image processing device 4 executes alignment for the pattern to be measured and the first master pattern for each divided region. FIG. 4 shows an alignment method for each divided region. As shown in FIG. 5A, the host computer 5 sets in advance a plurality of divided regions Em in the first master pattern M. Further, as shown in FIG. 5B, the host computer 5 sets in advance first alignment marks Fmx (Fmx1 to Fmx6) at four or more portions and second alignment marks Fmy (Fmy1 to Fmy6) at four or more portions in each divided region Em. The position and size of each divided region are set in advance, but the size of the divided region need not be constant.

Figure 5C:
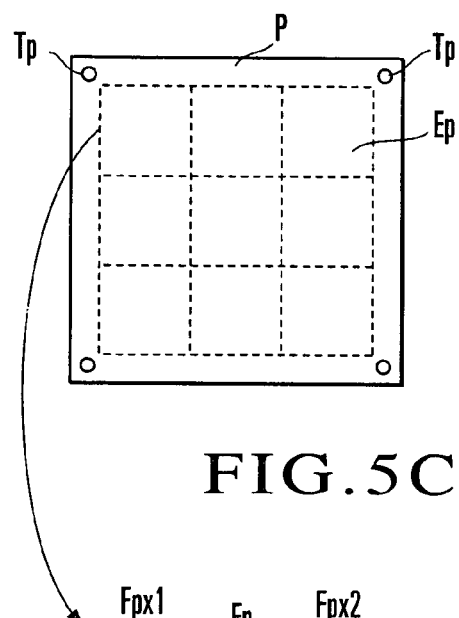

As shown in FIG. 5C, the image processing device 4 sets a plurality of divided regions Ep corresponding to the divided regions Em in the pattern P to be measured, in accordance with the divided regions Em which are set in advance in the first master pattern M by the host computer 5. The image processing device 4 cuts out one divided region Em from the first master pattern M, and cuts out a divided region Ep corresponding to the divided region Em from the pattern P (step S201 in FIG. 4).

Figure 5D:
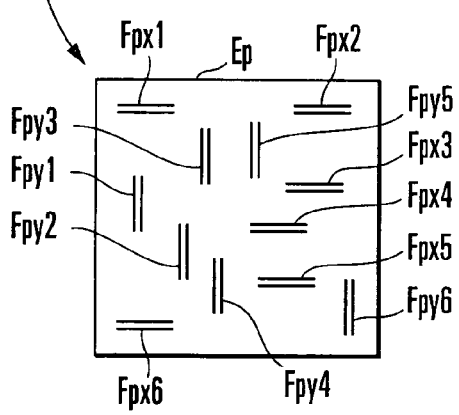

As shown in FIG. 5D, the image processing device 4 searches the corresponding divided region Ep of the pattern P for first alignment marks Fpx (Fpx1 to Fpx6) corresponding to the alignment marks Fmx (Fmx1 to Fmx6) which are set in advance in the divided region Em cut out from the first master pattern M, and second alignment marks Fpy (Fpy1 to Fpy6) corresponding to the alignment marks Fmy (Fmy1 to Fmy6) (steps S202 and S203 in FIG. 4).

A method of setting the alignment marks Fmx, Fmy, Fpx, and Fpy will be described with reference to FIGS. 6A to 6D. In the first embodiment, a pattern parallel in the X direction in the divided region Em is defined as the alignment mark Fmx, and the coordinates of a center Cmx of a pattern width Wmx are set as those of the alignment mark Fmx. A pattern parallel in the Y direction in the divided region Em is defined as the alignment mark Fmy, and the coordinates of a center Cmy of a pattern width Wmy are set as those of the alignment mark Fmy.

The host computer 5 automatically selects alignment marks Fmx at four or more portions and alignment marks Fmy at four or more portions in the divided region Em.

Figure 6A:
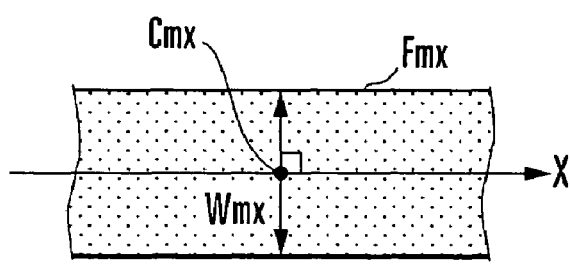
FIGS. 6A to 6D are views for explaining the method of aligning the pattern to be measured and the master pattern for each divided region.

As shown in FIG. 6A, the width Wmx of the alignment mark Fmx can be obtained by measuring the distance between pattern edges along the Y direction. The Y-coordinate of the alignment mark Fmx is the Y-coordinate of the center Cmx of the width Wmx. As for the X-coordinate of the alignment mark Fmx, an arbitrary coordinate can be selected on the alignment mark Fmx.

Figure 6B:
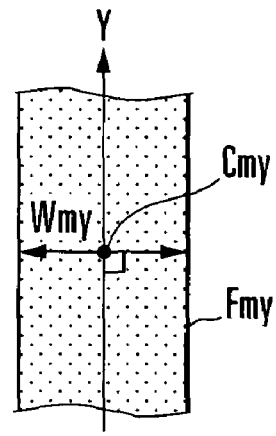

As shown in FIG. 6B, the width Wmy of the alignment mark Fmy can be obtained by measuring the distance between pattern edges along the X direction. The X-coordinate of the alignment mark Fmy is the X-coordinate of the center Cmy of the width Wmy. As for the Y-coordinate of the alignment mark Fmy, an arbitrary coordinate can be selected on the alignment mark Fmy.

The host computer 5 stores the X- and Y-coordinates of the alignment mark Fmx and those of the alignment mark Fmy in creating the first master pattern M. The alignment marks Fmx and Fmy are set for each divided region Em.

Figure 6C:
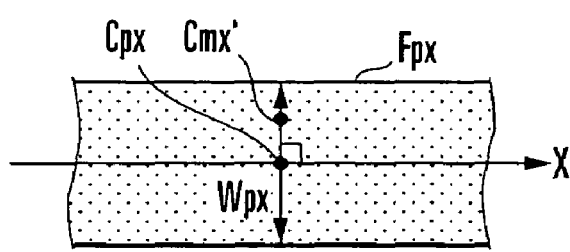

As shown in FIG. 6C, the image processing device 4 searches a divided region Ep of the pattern P that corresponds to a divided region Em cut out from the first master pattern M, for a pattern closest to a point Cmx' at the same coordinates as those of the alignment mark Fmx (step S202). This pattern is an alignment mark Fpx corresponding to the alignment mark Fmx. Search for the alignment mark Fpx is performed for each alignment mark Fmx in the divided region Em.

Figure 6D:
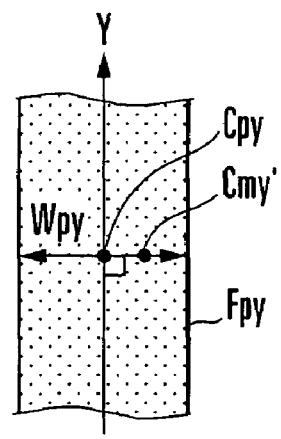

As shown in FIG. 6D, the image processing device 4 searches the divided region Ep of the pattern P that corresponds to the divided region Em cut out from the first master pattern M, for a pattern closest to a point Cmy' at the same coordinates as those of the alignment mark Fmy (step S203). This pattern is an alignment mark Fpy corresponding to the alignment mark Fmy. Search for the alignment mark Fpy is performed for each alignment mark Fmy in the divided region Em.

The reason why a pattern closest to the alignment mark Fmx is set as the alignment mark Fpx and a pattern closest to the alignment mark Fmy is set as the alignment mark Fpy is that alignment of the entire pattern to be measured and the entire first master pattern has ended.

The image processing device 4 calculates the coordinates of the searched alignment marks Fpx and Fpy (steps S204 and S205 in FIG. 4).

As shown in FIG. 6C, a width Wpx of the alignment mark Fpx can be obtained by measuring the distance between pattern edges along the Y direction. The Y-coordinate of the alignment mark Fpx is the Y-coordinate of a center Cpx of the width Wpx. The X-coordinate of the alignment mark Fpx coincides with that of the alignment mark Fmx (step S204).

As shown in FIG. 6D, a width Wpy of the alignment mark Fpy can be obtained by measuring the distance between pattern edges along the X direction. The X-coordinate of the alignment mark Fpy is the X-coordinate of a center Cpy of the width Wpy. The Y-coordinate of the alignment mark Fpy coincides with that of the alignment mark Fmy (step S205).

After calculation of coordinates, the image processing device 4 obtains a coordinate transformation equation such as equation (1) between the pattern to be measured and the first master pattern by the least-squares method on the basis of the coordinates of the alignment mark Fmx (Fmx1 to Fmx6) and those of a corresponding alignment mark Fpx (Fpx1 to Fpx6) (step S206):

$$Ym = DXp + EYp + F \quad (1)$$

The image processing device 4 obtains a coordinate transformation equation such as equation (2) between the pattern to be measured and the first master pattern by the least-squares method on the basis of the coordinates of the alignment mark Fmy (Fmy1 to Fmy6) and those of a corresponding alignment mark Fpy (Fpy1 to Fpy6) (step S207):

$$Xm = AXp + BYp + C \quad (2)$$

where Xm and Ym are the X- and Y-coordinates of the first master pattern, Xp and Yp are the X- and Y-coordinates of the pattern to be measured, and A, B, C, D, E, and F are constants.

The image processing device 4 calculates the coordinate Ym by substituting, as Xp and Yp, the coordinates of an arbitrary alignment mark, e.g., the alignment mark Fpx1 out of the alignment marks Fpx1 to Fpx6 into coordinate transformation equation (1). The image processing device 4 obtains the deviation between the calculated coordinate Ym and the Y-coordinate of the alignment mark Fmx1 corresponding to the alignment mark Fpx1 substituted into the coordinate transformation equation. The deviation is calculated for each alignment mark Fpx (step S208).

The image processing device 4 calculates the coordinate Xm by substituting, as Xp and Yp, the coordinates of an arbitrary alignment mark, e.g., the alignment mark Fpy1 out of the alignment marks Fpy1 to Fpy6 into coordinate transformation equation (2). The image processing device 4 obtains the deviation between the calculated coordinate Xm and the X-coordinate of the alignment mark Fmy1 corresponding to the alignment mark Fpy1 substituted into the coordinate transformation equation. The deviation is calculated for each alignment mark Fpy (step S209).

Subsequently, the image processing device 4 determines whether each calculated deviation is larger than a predetermined threshold (step S210).

If all deviations are equal to or smaller than the predetermined threshold, the image processing device 4 determines that the distortion of the divided region Ep of the pattern to be measured falls within an allowable range and the derived coordinate transformation equations are proper. The image processing device 4 executes coordinate transformation of the first master pattern within the divided region Em by using the coordinate transformation equations (step S211).

If all deviations are larger than the predetermined threshold, the image processing device 4 determines that the distortion of the divided region Ep of the pattern to be measured falls outside the allowable range and the inspection work 1 is a defective (YES in step S212).

If some deviations equal to or smaller than the threshold and some deviations larger than it coexist, the image processing device 4 excludes alignment marks whose deviations are larger than the threshold (step S213). The image processing device 4 obtains again coordinate transformation equations (1) and (2) by using the coordinates of remaining alignment marks (steps S206 and S207).

When alignment marks whose deviations are larger than the threshold are, e.g., Fmx6 and corresponding Fpx6, the image processing device 4 excludes these alignment marks, and then obtains coordinate transformation equation (1) by using the coordinates of the remaining alignment marks Fmx1 to Fmx5 and Fpx1 to Fpx5. However, coordinate transformation equation (2) need not be obtained again for the alignment marks Fmy1 to Fmy6 and Fpy1 to Fpy6 whose deviations are equal to or smaller than the threshold.

When alignment marks whose deviations are larger than the threshold are, e.g., Fmy6 and corresponding Fpy6, the image processing device 4 excludes these alignment marks, and then obtains coordinate transformation equation (2) by using the coordinates of the remaining alignment marks Fmy1 to Fmyx5 and Fpy1 to Fpy5. However, coordinate transformation equation (1) need not be obtained again for the alignment marks Fmx1 to Fmx6 and Fpx1 to Fpx6 whose deviations are equal to or smaller than the threshold.

When alignment marks whose deviations are larger than the threshold are, e.g., Fmx6, Fpx6, Fmy6, and Fpy6, the image processing device 4 excludes these alignment marks. The image processing device 4 obtains coordinate transformation equation (1) by using the coordinates of the alignment marks Fmx1 to Fmx5 and Fpx1 to Fpx5, and obtains coordinate transformation equation (2) by using the coordinates of the alignment marks Fmy1 to Fmy5 and Fpy1 to Fpy5.

The processes in steps S206 to S210, S212, and S213 are repeated until each deviation becomes equal to or lower than the predetermined threshold. In this way, coordinate transformation equations (1) and (2) can be determined, and transformation of the master pattern in step S211 can be performed using these coordinate transformation equations. The use of coordinate transformation equations (1) and (2) means execution of so-called affine transformation. This can correct misalignment between the divided regions Em and Ep. As a result, the alignment process for the pattern to be measured and the first master pattern for each divided region ends.

The first embodiment determines coordinate transformation equations by repeating a process of excluding alignment marks whose deviations are larger than a predetermined threshold, from both the pattern to be measured and the first master pattern, and obtaining coordinate transformation equations again until all deviations become equal to or smaller than the predetermined threshold. Accordingly, the precision of coordinate transformation equations can be increased, achieving high-precision alignment.

To obtain coordinate transformation equation (1), at least three alignment marks Fmx and at least three alignment marks Fpx are required for the first master pattern and the pattern to be measured. However, three alignment marks Fmx and three alignment marks Fpx provide only a low-precision coordinate transformation equation. For this reason, at least four alignment marks Fmx and at least four alignment marks Fpx are designated, and an alignment mark whose deviation is larger than the threshold is excluded from derivation of the coordinate transformation equation. Similarly, coordinate transformation equation (2) also requires at least four alignment marks Fmy and at least four alignment marks Fpy.

If three alignment marks are used for each of the first master pattern and the pattern to be measured but each deviation does not become equal to or smaller than the threshold, the number of alignment marks cannot be decreased to two in order to obtain a coordinate transformation equation. Also in this case, the inspection work 1 is determined to be a defective.

According to the first embodiment, a plurality of patterns parallel in the X direction are automatically selected as first alignment marks from the first master pattern. At the same time, a plurality of patterns parallel in the Y direction are automatically selected as second alignment marks from the first master pattern. The operator of the pattern inspection apparatus need not register the alignment marks of the first master pattern in the apparatus. When the corner of a pattern is used as an alignment mark, like an alignment method disclosed in Japanese Patent Laid-Open No. 2000-149020, and the error of the width of the pattern to be measured with respect to the width of the first master pattern is large, alignment fails under the influence of the error. To the contrary, according to the first embodiment, the central coordinates of the width of a pattern selected as a first alignment mark are defined as the coordinates of the first alignment mark, and the central coordinates of the width of a pattern selected as a second alignment mark are defined as the coordinates of the second alignment mark. Alignment is hardly influenced by the error of the width of the pattern to be measured with respect to the first master pattern.

In a conventional alignment method of performing only whole alignment of the first master pattern and the pattern to be measured, if an inspection work has a distortion such as a local extension or contraction, a local shift from the first master pattern is generated and detected as a defect. On the contrary, in the first embodiment, a local distortion of the inspection work 1 is absorbed by alignment for each divided region on the basis of coordinate transformation equations as far as the local distortion of the inspection work 1 falls within an allowable range (i.e., the deviation is equal to or smaller than the threshold). Thus, the distortion is not detected as a defect.

In the first embodiment, the third alignment marks Tm of the master pattern must be registered in advance for whole alignment, but a small number of alignment marks Tm suffice and their registration does not take a long time. Although divided regions do not overlap each other in FIGS. 5A and 5C, actual divided regions are set to overlap other divided regions at right, left, upper, and lower portions in order to inspect links between the divided regions. By setting divided regions so as to overlap other divided regions at right, left, upper, and lower portions, whether distortions at the boundaries between divided regions fall within an allowable range can be determined from the deviations of adjacent divided regions.

After the end of the alignment process in step S104, the host computer 5 detects a base position in the continuous tone image of the pattern to be measured (step S105). In the first master pattern, the base and conductor are clearly discriminated. Since the first master pattern and the continuous tone image of the pattern to be measured have been aligned in step S104, the base position in the continuous tone image of the pattern to be measured can be obtained from the aligned first master pattern.

Figure 7A:
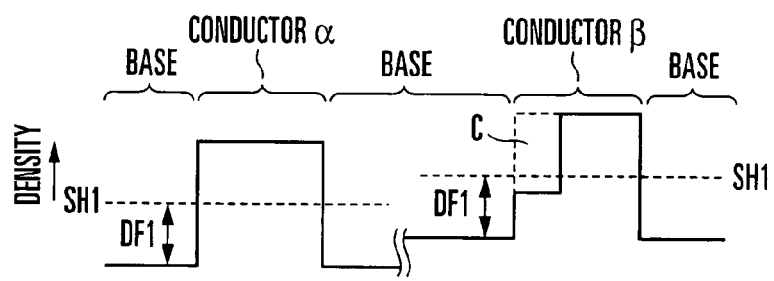
FIGS. 7A to 7D are charts for explaining a threshold setting method in the first embodiment of the present invention.
Figure 7B:
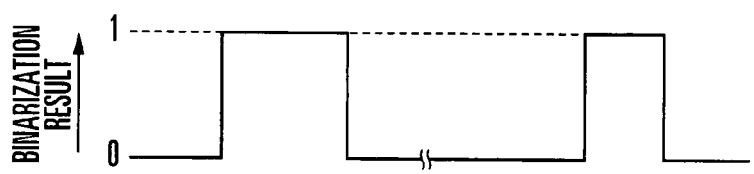
Figure 7C:
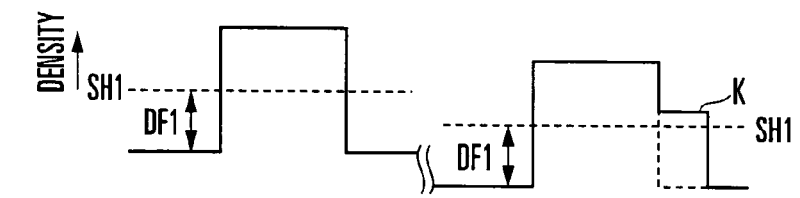

The host computer 5 sets a threshold used to binarize continuous tone image data of the pattern to be measured (step S106). As described above, continuous tone image data of the pattern to be measured contains density variations due to the inclination of the work surface with respect to the camera 3 and a change over time in illumination light quantity. In order to eliminate the influence of density variations, the host computer 5 checks a density value at the base position in the continuous tone image of the pattern to be measured that has been detected in step S105. The host computer 5 sets a threshold SH1 so that a difference DF1 from the density value of the base is always kept constant (FIGS. 7A and 7C).

Figure 7D:
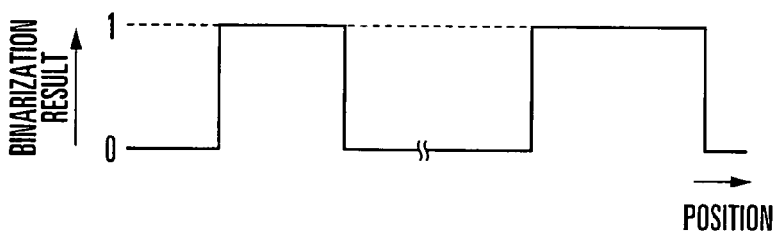

The image processing device 4 binarizes continuous tone image data of the pattern to be measured on the basis of the threshold SH1 set by the host computer 5 (step S107). As described above, the threshold SH1 is set so that the difference from the density value of the base is always the predetermined value DF1. Even if large density variations exist near a conductor β and the density becomes higher than that at the position of a conductor α, as shown in FIG. 7A, a deficit C of the conductor β is converted into a value "0" representing the base. Thus, the deficit C can be detected by inspection (to be described later) (FIG. 7B). Also when large density variations exist near the conductor β and the density becomes lower than that at the position of the conductor α, as shown in FIG. 7C, a projection K of the conductor β is converted into a value "1" representing the conductor. The projection K can be detected by inspection (to be described later) (FIG. 7D).

The image processing device 4 compares the binarized pattern to be measured and the master pattern, and inspects the pattern to be measured (step S108). A method of detecting the disconnection or short circuit of a pattern to be measured by software is disclosed in, e.g., Japanese Patent Laid-Open No. 6-273132. A method of detecting the pattern width of a pattern to be measured by software is disclosed in, e.g., Japanese Patent Laid-Open No. 7-110863. A detailed description of these methods will be omitted.

A method of inspecting a pattern to be measured at a high speed by logical calculation using hardware will be explained. This inspection method is disclosed in, e.g., Japanese Patent Laid-Open No. 10-141930.

Figure 8A:
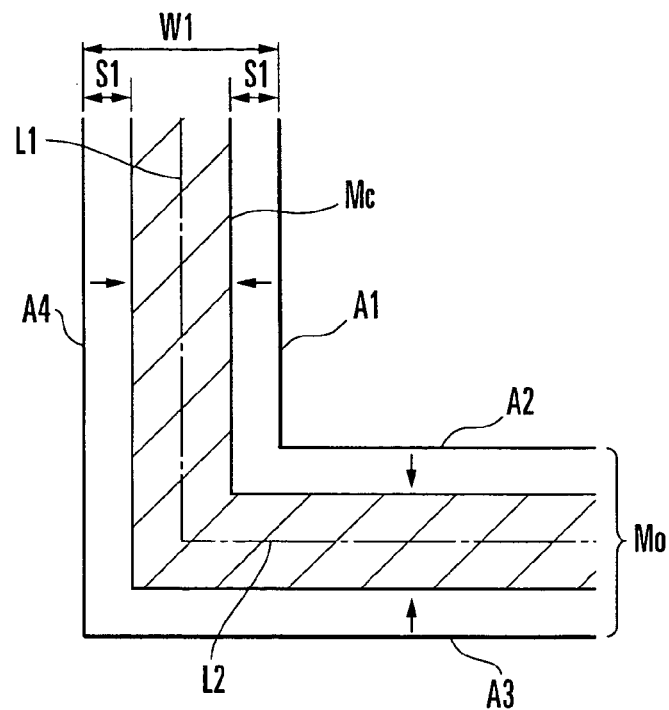
FIGS. 8A and 8B are views for explaining a method of creating a master pattern for detecting a deficit, pinhole, or disconnection and a master pattern for detecting a projection, scattering, or short circuit.
Figure 8B:
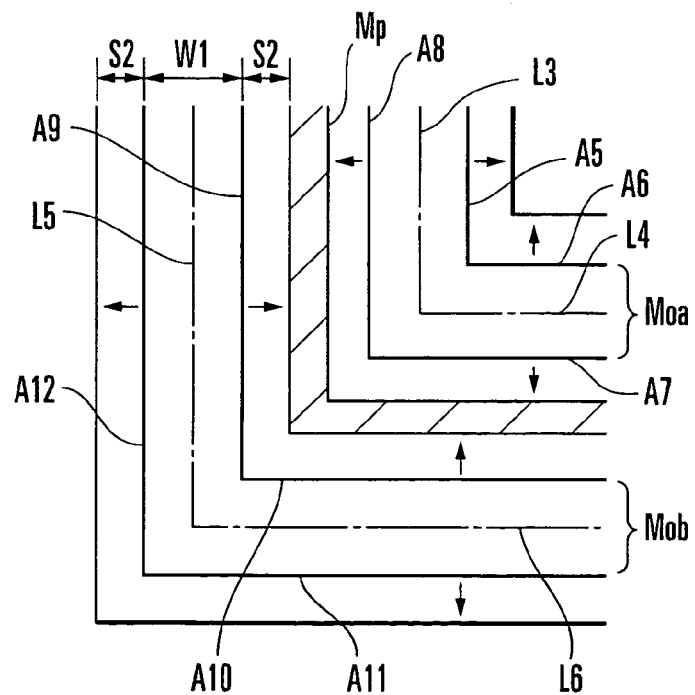

According to this inspection method, the host computer 5 contracts in a direction perpendicular to the center line a first master pattern Mo created in step S102, and thereby creates a second master pattern Mc for detecting a deficit, pinhole, or disconnection (FIG. 8A). Also, the host computer 5 expands the first master pattern Mo in a direction perpendicular to the center line, and thereby creates a third master pattern Mp for detecting a projection, scattering, or short circuit (FIG. 8B). In the example of FIG. 8A, the second master pattern Mc is created by contracting the first master pattern Mo made up of straight lines A1 and A4 (center line is L1) and straight lines A2 and A3 (center line is L2). In FIG. 8B, the third master pattern Mp is actually formed from a region obtained by logically inverting an expansion result, i.e., a region sandwiched between two patterns generated by expanding a master pattern Moa made up of straight lines A5 to A8 and a master pattern Mob made up of straight lines A9 to A12.

Figure 9A:
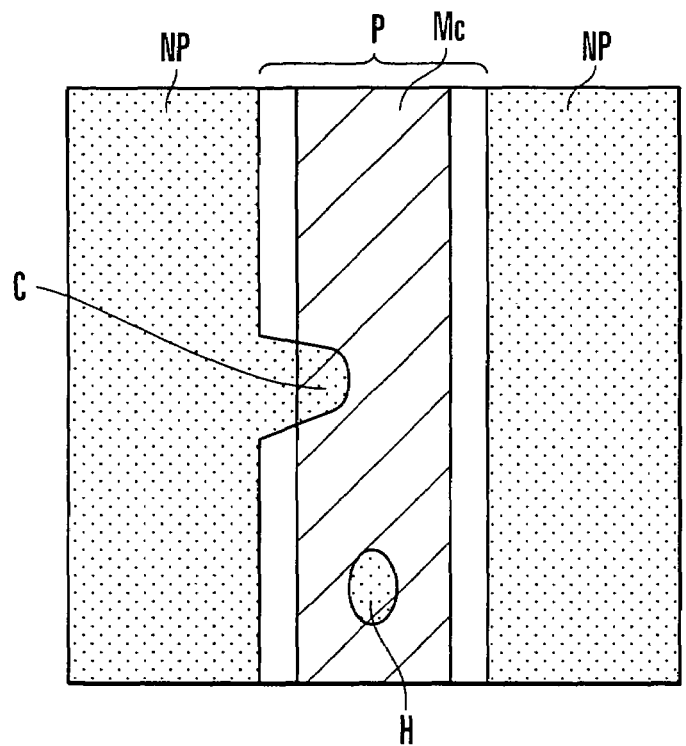
FIGS. 9A and 9B are views for explaining an inspection method of inspecting a defect of the pattern to be measured by logical operation between the master pattern and the pattern to be measured.

The image processing device 4 inspects the pattern to be measured by comparing the binarized pattern and the second and third master patterns Mc and Mp. Inspection by a comparison with the second master pattern Mc for detecting a deficit, pinhole, or disconnection will be explained. FIG. 9A shows this inspection method. In the example of FIG. 9A, a portion except satin patterns NP is the pattern P to be measured. As shown in FIG. 9A, the image processing device 4 compares the pattern P with the second master pattern Mc. Patterns which are actually compared are the second master pattern Mc and the pattern NP prepared by logically inverting the pattern P.

When the pattern NP and second master pattern Mc are ANDed, the AND result changes depending on whether the pattern P has a deficit or disconnection. For example, when the pattern P has a value "1", the second master pattern Mc also has "1", and the pattern P is free from any deficit or disconnection, the pattern NP and second master pattern Mc do not overlap each other, and the AND result becomes "0".

To the contrary, if the pattern P has the deficit C, as shown in FIG. 9A, the pattern NP and second master pattern Mc overlap each other at this portion, and the AND result becomes "1". This also applies to a case in which the pattern to be measured has a pinhole H or disconnection. In this fashion, a deficit, pinhole, or disconnection of the pattern to be measured can be detected.

Figure 9B:
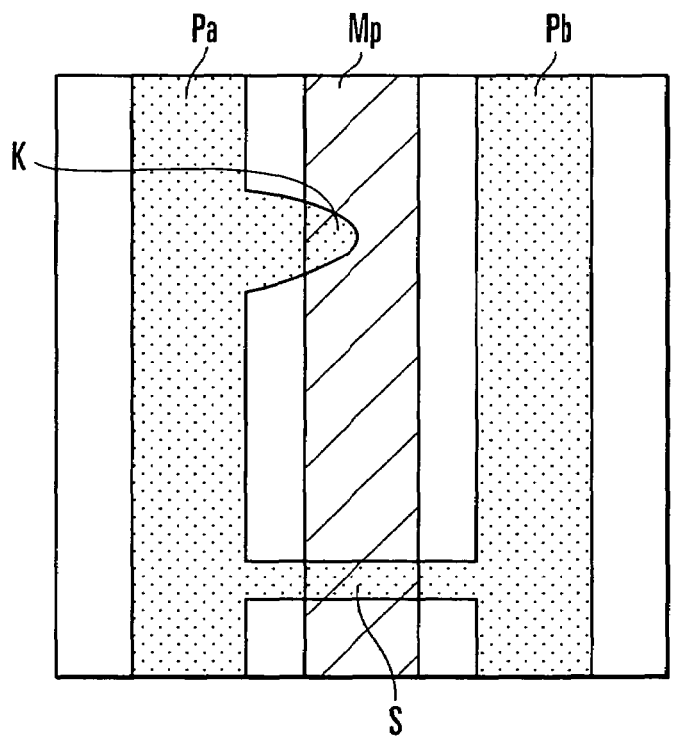

Inspection by a comparison with the third master pattern Mp for detecting a projection, scattering, or short circuit will be explained. FIG. 9B shows this inspection method. As shown in FIG. 9B, the image processing device 4 compares the pattern P with the third master pattern Mp. Similar to the above-mentioned inspection method, when patterns Pa and Pb to be measured and the third master pattern Mp are ANDed, the AND result changes depending on whether the patterns Pa and Pb have a projection or short circuit. That is, if the patterns Pa and Pb do not have any projection or short circuit, the AND result becomes "0".

If the pattern Pa has the projection K, as shown in FIG. 9B, the pattern Pa and third master pattern Mp overlap each other at this portion, and the AND result becomes "1". If a short circuit S exists between the patterns Pa and Pb, the AND result becomes "1". This also applies to a case in which the pattern to be measured suffers scattering. In this manner, a projection, scattering, or short circuit of the pattern to be measured can be detected. Note that a defect candidate of the pattern to be measured may be detected by inspection described with reference to FIGS. 8A, 8B, 9A, and 9B, and only a region of a predetermined size including the detected defect candidate may be inspected by software.

As described above, according to the first embodiment, the threshold SH1 is set so that the difference from the density value of a base is always kept constant in the continuous tone image of a pattern to be measured, and the continuous tone image is binarized on the basis of the threshold SH1. The influence of density variations present in the continuous tone image of the pattern to be measured can be eliminated, and a defect of the pattern can be accurately detected. In the first embodiment, a master pattern and the continuous tone image of a pattern to be measured are aligned, and the base position in the continuous tone image of the pattern to be measured is detected on the basis of the aligned-master pattern. None of optical detection means, threshold setting circuit, and binarization circuit need be arranged in addition to the arrangement for binarizing continuous tone image data. The arrangement for binarizing continuous tone image data while eliminating the influence of density variations can be simplified in comparison with pattern inspection apparatuses disclosed in Japanese Patent No. 2,543,585 and Japanese Patent Laid-Open No. 5-248836 described above.

Since the second and third master patterns Mc and Mp are created by contracting and expanding the first master pattern Mo, the second and third master patterns Mc and Mp and the pattern to be measured need not be aligned again.

When an alignment process for a pattern to be measured and a master pattern for each divided region is executed after the whole alignment process, like the first embodiment, the alignment process for each divided region in step S104 and the processes in steps S105 to S108 are executed for each divided region until all divided regions are inspected (step S109). In this case, the whole alignment process in the process of step S104 need not be performed again, and the processes in steps S105 to S108 are done between aligned divided regions Em and Ep.

Second Embodiment

In the first embodiment, continuous tone image data of a pattern to be measured is binarized at the threshold SH1 which always keeps the difference from the density value of the base constant. However, binarization using the single threshold SH1 may miss a defect of the pattern even if no density variations occur.

Figure 10:
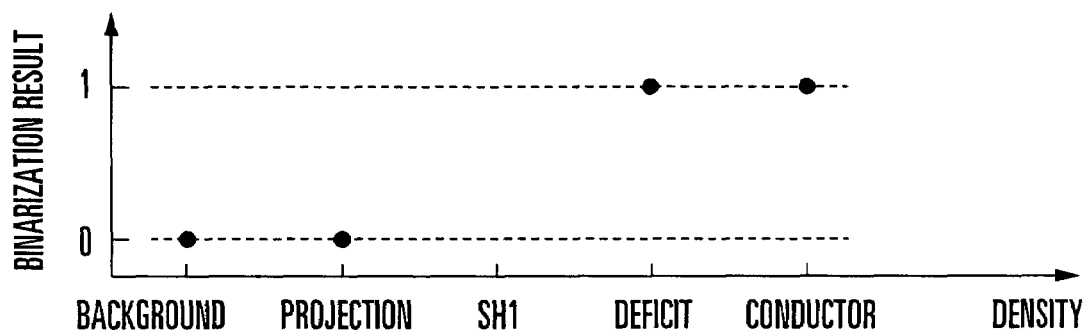
FIG. 10 is a graph showing the result of binarizing the continuous tone image of the pattern to be measured at a single threshold.

As shown in FIG. 10, the density value of a deficit portion or disconnection portion is higher than that of the base and close to that of the conductor. To the contrary, the density value of a projection portion or short circuit portion is lower than that of the conductor and close to that of the base. For this reason, binarization using the single binarization threshold SH1 converts a defect such as a deficit or disconnection into "1", and a defect such as a projection or short circuit into "0". Even if inspection is executed for the binarization result of FIG. 10, such defect cannot be detected.

Figure 11:
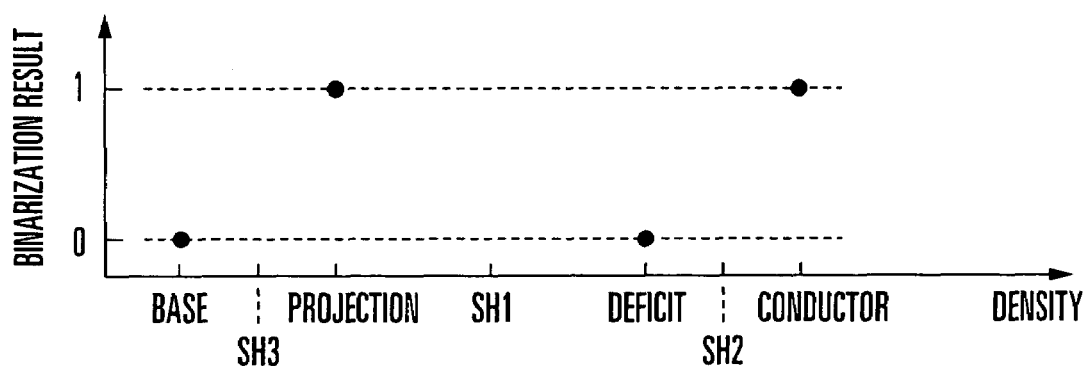
FIG. 11 is a graph showing the result of binarizing the continuous tone image of the pattern to be measured at a plurality of thresholds.

As proposed in a pattern inspection method disclosed in Japanese Patent Laid-Open No. 10-293847, the present inventors set a value between the density value of a deficit or disconnection and that of a projection or short circuit as a threshold SH1, a value between the density value of the conductor and that of a deficit or disconnection as a threshold SH2, and a value between the density value of a projection or short circuit and that of the base as a threshold SH3 (FIG. 11).

An image processing device 4 performs binarization based on the threshold SH2 for a region of the continuous tone image of a pattern to be measured that corresponds to a second master pattern Mc (FIG. 8A) for detecting a deficit, pinhole, or disconnection. The image processing device 4 performs binarization based on the threshold SH3 for a region corresponding to a third master pattern Mp (FIG. 8B) for detecting a projection, scattering, or short circuit. The image processing device 4 performs binarization based on the threshold SH1 for the remaining region. In the region corresponding to the second master pattern Mc, a defect such as a deficit or disconnection is converted into a value "0" representing the base. In the region corresponding to the third master pattern Mp, a defect such as a projection or short circuit is converted into a value "1" representing the conductor. A defect of a pattern to be measured can be accurately detected by executing inspection described with reference to FIGS. 9A and 9B for a binarized pattern to be measured.

However, a problem caused by density variations described above occurs even if a plurality of thresholds are set, like the pattern inspection method disclosed in Japanese Patent Laid-Open No. 10-293847. To solve this problem, the threshold is set in accordance with density variations in continuous tone image data of a pattern to be measured, similar to the first embodiment.

FIGS. 12A to 12D show a threshold setting method according to the second embodiment. In FIGS. 12A to 12D, Mc means a region corresponding to the second master pattern Mc, and Mp means a region corresponding to the third master pattern Mp. In the second embodiment, the thresholds SH1, SH2, and SH3 are set so that differences from the density value of the base become predetermined values DF1, DF2, and DF3.

Figure 12A:
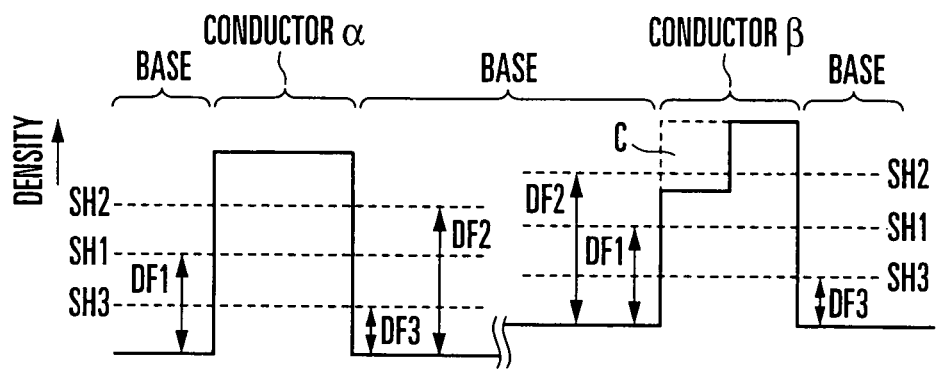
FIGS. 12A to 12D are charts for explaining a threshold setting method in the second embodiment of the present invention.
Figure 12B:
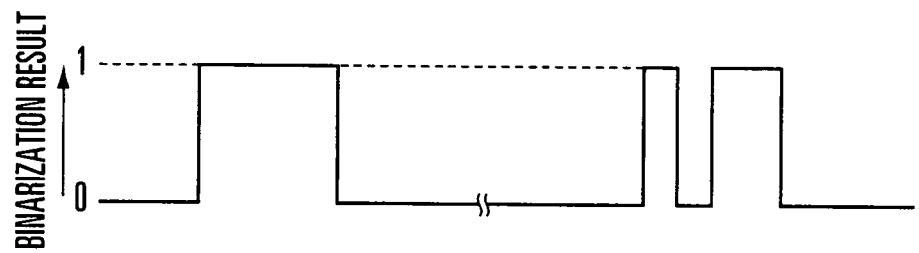

The threshold SH2 is set so that the difference from the density value of the base always becomes the predetermined value DF2. Even if large density variations exist near a conductor β and the density becomes higher than that at the position of a conductor α, as shown in FIG. 12A, a deficit C of the conductor β in a region corresponding to the second master pattern Mc is converted into "0" (converted into "1" for the above-mentioned pattern NP because the logic in FIG. 12B is inverted), as shown in FIG. 12B. The deficit C can, therefore, be detected by inspection in FIG. 9A.

Figure 12C:
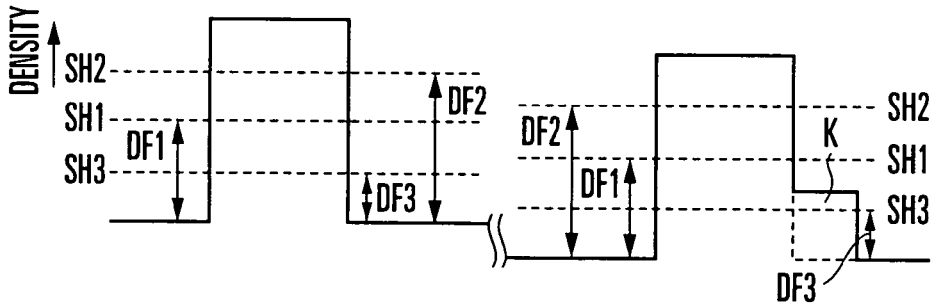
Figure 12D:
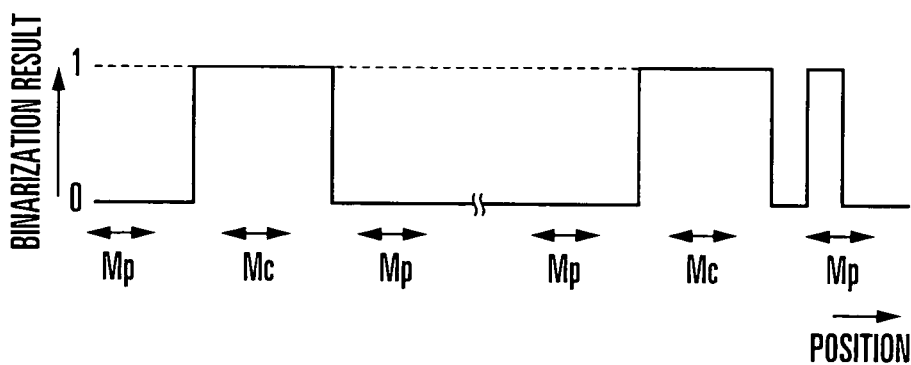

The threshold SH3 is set so that the difference from the density value of the base is always the predetermined value DF3. Even when large density variations exist near the conductor β and the density becomes lower than that at the position of the conductor α, as shown in FIG. 12C, a projection K of the conductor β in a region corresponding to the third master pattern Mp is converted into "1", as shown in FIG. 12D. The projection K can be detected by inspection in FIG. 9B.

The influence of density variations in regions not corresponding to the second and third master patterns Mc and Mp can be eliminated by setting the threshold SH1 so that the difference from the density value of the base becomes the predetermined value DF1, similar to the first embodiment.

As described above, according to the second embodiment, the thresholds SH1, SH2, and SH3 are set in accordance with density variations in continuous tone image data of a pattern to be measured. The influence of density variations can be eliminated, and a defect of the pattern can be accurately detected.

Third Embodiment

In the first and second embodiments, the threshold is set so that the difference from the density value of the base is always kept constant. The threshold may also be set so that the ratio of the difference between the threshold and the density value of the base and the difference between the density values of the conductor and base is always kept constant.

Figure 13A:
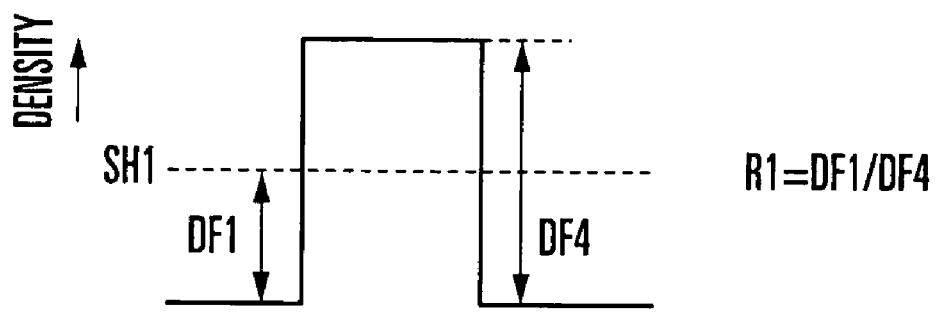
FIGS. 13A and 13B are charts for explaining a threshold setting method in the third embodiment of the present invention.

When the threshold setting method of the third embodiment is applied to the first embodiment, a host computer 5 detects the positions of a base and conductor in the continuous tone image of a pattern to be measured (step S105 in FIG. 1). Similar to the base position, the conductor position can also be obtained from a master pattern aligned in step S104. As shown in FIG. 13A, the host computer 5 sets a threshold SH1 so that a ratio DF1/DF4 of a difference DF1 between the threshold SH1 and the density value of the base and a difference DF4 between the density values of the conductor and base always becomes a predetermined value R1 (step S106). The remaining processes are the same as those in the first embodiment.

Figure 13B:
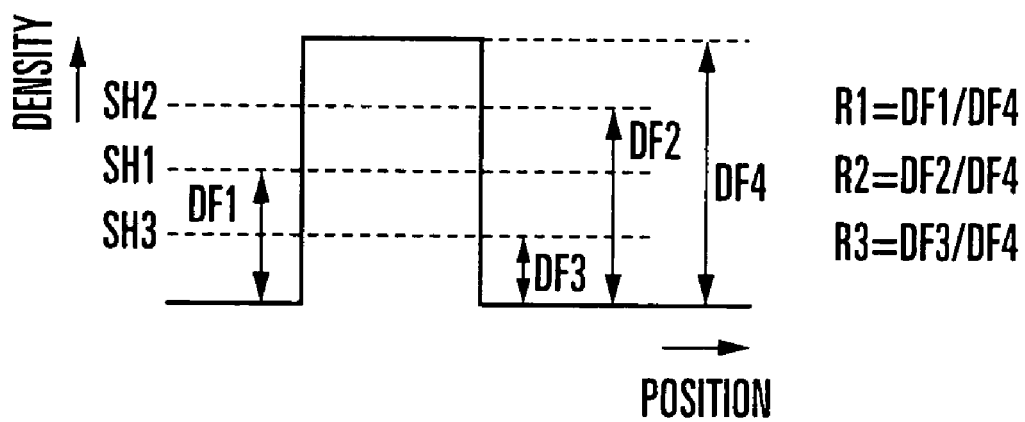

Similarly when the threshold setting method of the third embodiment is applied to the second embodiment, the host computer 5 detects the positions of a base and conductor in the continuous tone image of a pattern to be measured. The host computer 5 then detects the positions of the base and conductor in the continuous tone image of the pattern. The host computer 5 sets the threshold SH1 so that the ratio DF1/DF4 always becomes the predetermined value R1. The host computer 5 sets a threshold SH2 so that a ratio DF2/DF4 of a difference DF2 between the threshold SH2 and the density value of the base and a difference DF4 between the density values of the conductor and base always becomes a predetermined value R2. The host computer 5 sets a threshold SH3 so that a ratio DF3/DF4 of a difference DF3 between the threshold SH3 and the density value of the base and the difference DF4 between the density values of the conductor and base always becomes a predetermined value R3 (FIG. 13B).

In this manner, the third embodiment can also attain the same effects as those of the first and second embodiments.

Compared to the first and second embodiments, the third embodiment can more properly set a threshold even for a fine pattern to be measured because of the following reason. When a highly precise work is to be inspected at a high frequency, a camera or the like cannot follow the fine work, generating an error such that the density value of the base becomes higher than an original one. In the first and second embodiments in which the threshold is set using only the density value of the base, the threshold cannot be set in accordance with density variations, failing to eliminate density variations. To the contrary, in the third embodiment, the threshold is set using both the density values of the conductor and base, and thus the threshold can be appropriately set even for a fine pattern to be measured.

Fourth Embodiment

The fourth embodiment of the present invention will be described. Also in the fourth embodiment, the arrangement of a pattern inspection apparatus is the same as that in the first embodiment, and the pattern inspection apparatus will be explained using reference numerals in FIG. 2.

An image processing device 4 according to the fourth embodiment comprises an alignment means for aligning a master pattern and a pattern to be measured, a first binarization means for binarizing the continuous tone image of the pattern to be measured on the basis of the second binarization threshold (to be described later) to generate the first pattern to be measured, a second binarization means for binarizing the continuous tone image on the basis of the third binarization threshold (to be described later) to generate the second pattern to be measured, a first inspection means for comparing the error amount between the first pattern to be measured and the master pattern with the first inspection threshold (to be described later), and a second inspection means for comparing the error amount between the second pattern to be measured and the master pattern with the second inspection threshold (to be described later). At least one of the alignment means and the first and second inspection means is implemented by a computer.

A host computer 5 according to the fourth embodiment comprises a first correction means for correcting the first inspection threshold which is set in advance in correspondence with the first binarization threshold and used to detect a deficit or disconnection, and a second correction means for correcting the second inspection threshold which is set in advance in correspondence with the first binarization threshold and used to detect a projection or short circuit. The host computer 5 and the internal computer of the image processing device 4 can be implemented by hardware resources each having, e.g., an arithmetic device, storage device, and interface, and a program for controlling these hardware resources.

Figure 14:
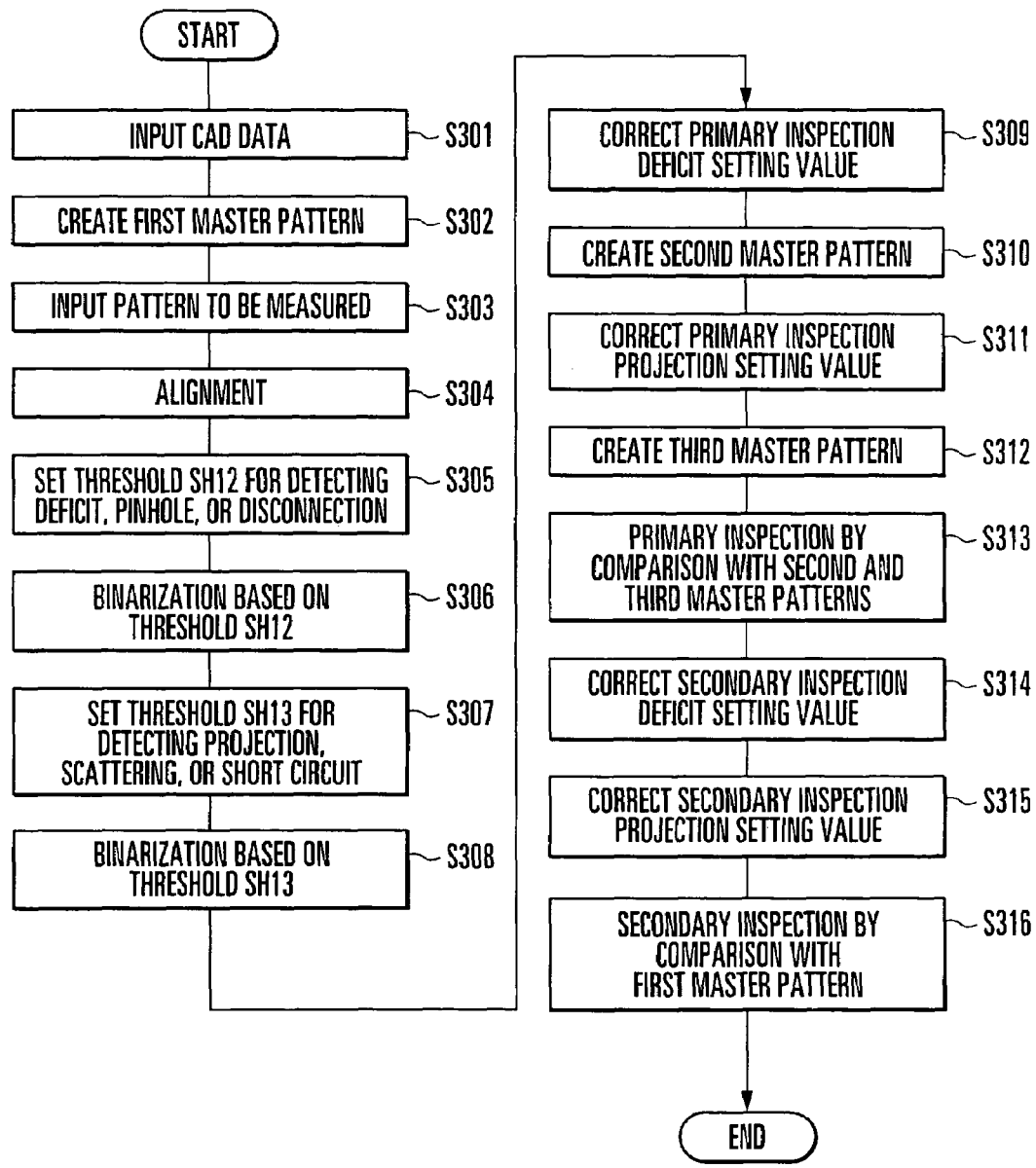
FIG. 14 is a flowchart showing a pattern inspection method according to the fourth embodiment of the present invention.

FIG. 14 shows a pattern inspection method according to the fourth embodiment of the present invention. Processes in steps S301 to S304 are the same as those in steps S101 to S104 in FIG. 1.

After the end of an alignment process in step S304, the host computer 5 sets for the image processing device 4 a binarization threshold used to binarize continuous tone image data of a pattern to be measured. In the binarization process, for example, a density value higher than the binarization threshold is converted into "1", and a density value equal to or lower than the binarization threshold is converted into "0". Consequently, a pattern to be measured in which the pattern edge and its internal region are filled with "1" can be obtained.

Figure 20:
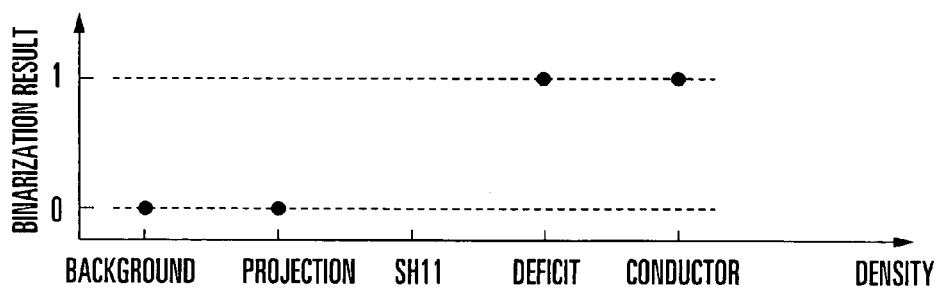
FIG. 20 is a graph showing the result of binarizing the continuous tone image of the pattern to be measured at a single threshold.

However, binarization using the first binarization threshold SH11 converts a defect such as a deficit, pinhole, or disconnection into "1", and a defect such as a projection, scattering, or short circuit into "0", as described with reference to FIG. 20.

Figure 21:
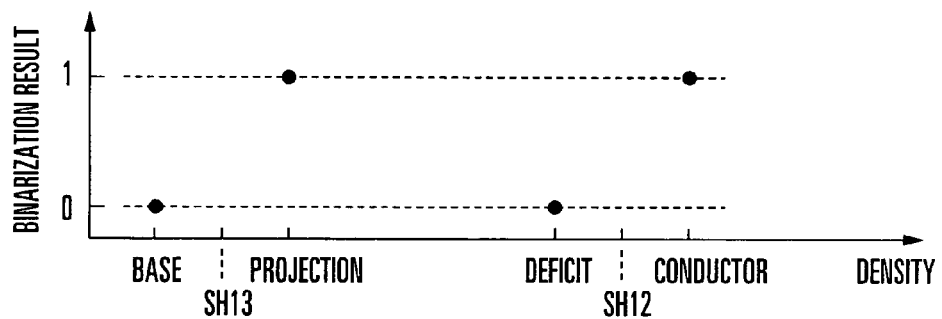
FIG. 21 is a graph showing the result of binarizing the continuous tone image of the pattern to be measured at two thresholds.
Figure 22:
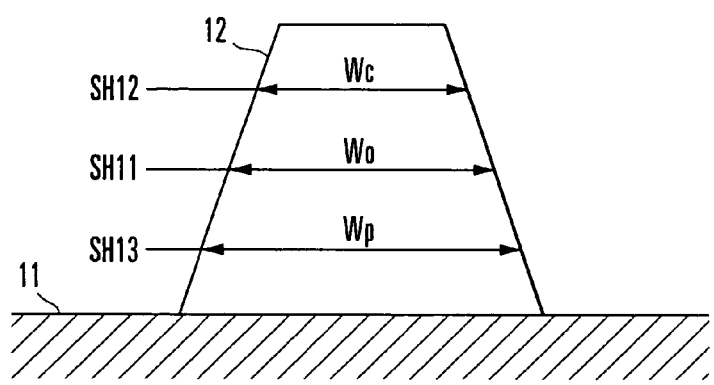
FIG. 22 is a sectional view showing the conductor of an inspection work.

To prevent this, the host computer 5 of the fourth embodiment sets for the image processing device 4 a second binarization threshold SH12 for detecting a deficit, pinhole, or disconnection (step S305 in FIG. 14). The image processing device 4 binarizes continuous tone image data of the pattern to be measured on the basis of the binarization threshold SH12 (step S306). By binarizing the pattern on the basis of the binarization threshold SH12, a defect such as a deficit, pinhole, or disconnection is converted into "0" representing the base, as shown in FIG. 21. The image processing device 4 stores in the image memory a first pattern to be measured that has been binarized on the basis of the binarization threshold SH12 and is used to detect a deficit, pinhole, or disconnection.

Subsequently, the host computer 5 sets for the image processing device 4 a third binarization threshold SH13 for detecting a projection, scattering, or short circuit (step S307 in FIG. 14). The image processing device 4 binarizes continuous tone image data of the pattern to be measured on the basis of the binarization threshold SH13 (step S308). By binarizing the pattern on the basis of the binarization threshold SH13, a defect such as a projection, scattering, or short circuit is converted into "1" representing the conductor, as shown in FIG. 21. The image processing device 4 stores in the image memory a second pattern to be measured that has been binarized on the basis of the binarization threshold SH13 and is used to detect a projection, scattering, or short circuit.

The image processing device 4 inspects the pattern to be measured by comparing the binarized pattern and a master pattern. In the fourth embodiment, a defect candidate of the pattern to be measured is detected by hardware (primary inspection), and only a predetermined small region containing the detected defect candidate is inspected by software (secondary inspection).

Primary inspection of inspecting a pattern to be measured at a high speed by logical operation using hardware will be explained. Similar to the first embodiment, the host computer 5 contracts in a direction perpendicular to the center line a first master pattern Mo created in step S302, and thereby creates a second master pattern Mc for detecting a deficit, pinhole, or disconnection (FIG. 8A). The defect detection precision by the second master pattern Mc depends on how much the first master pattern Mo is contracted. If a deficit with a primary inspection deficit setting value (first inspection threshold) S1 [pixel] or more is to be recognized as a defect, the first master pattern Mo is contracted by S1 each on the right and left sides (when the pattern to be measured is binarized on the basis of the binarization threshold SH11). A deficit with the primary inspection deficit setting value S1 or more can be detected by AND operation between the binarized pattern and the second master pattern Mc.

The primary inspection deficit setting value S1 is determined on the assumption that the continuous tone image of a pattern to be measured is binarized on the basis of the binarization threshold SH11. The fourth embodiment executes AND operation between the second master pattern Mc and the pattern to be measured that has been binarized on the basis of the binarization threshold SH12. Since the conductor of an inspection work 1 has a trapezoidal sectional shape, as described above, the conductor width narrows by a shift of the binarization threshold from SH11 to SH12. The primary inspection deficit setting value S1 must be corrected in accordance with such change (the width of the second master pattern Mc must be corrected).

Figure 15A:
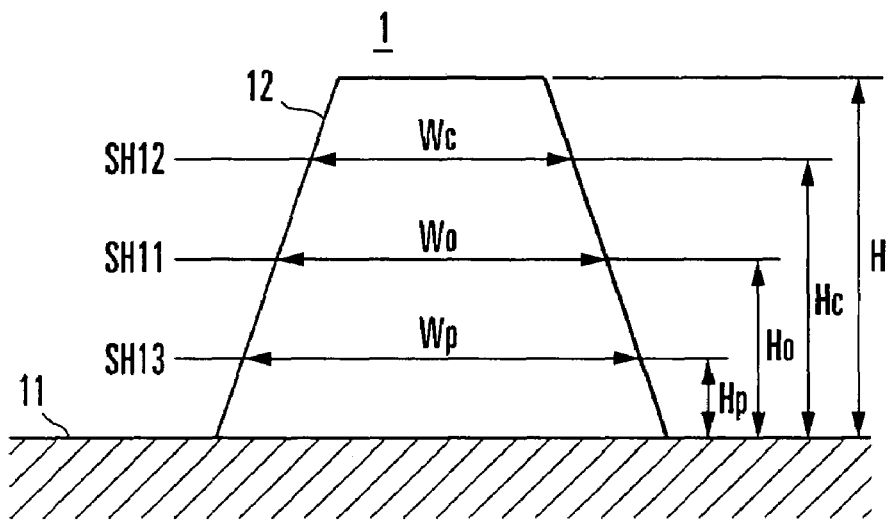
FIGS. 15A and 15B are views for explaining a method of correcting a primary inspection deficit setting value.

The operator of the pattern inspection apparatus measures in advance a first line width Wo [mm] of a conductor 12 at a height Ho corresponding to the binarization threshold SH11, a second line width Wc [mm] of the conductor 12 at a height Hc corresponding to the binarization threshold SH12, and a third line width Wp [mm] of the conductor 12 at a height Hp corresponding to the binarization threshold SH13 in the inspection work 1 on which the conductor 12 is formed on a base 11, as shown in FIG. 15A.

The binarization threshold SH11 is set so that a ratio DF1/DF4 of a difference DF1 between the binarization threshold SH11 and the density value of the base and a difference DF4 between the density values of the conductor and base becomes a predetermined value R1. The binarization threshold SH12 is set so that a ratio DF2/DF4 of a difference DF2 between the binarization threshold SH12 and the density value of the base and the difference DF4 between the density values of the conductor and base becomes a predetermined value R2. The binarization threshold SH13 is set so that a ratio DF3/DF4 of a difference DF3 between the binarization threshold SH13 and the density value of the base and the difference DF4 between the density values of the conductor and base-becomes a predetermined value R3.

From this, if an actual dimension corresponding to the difference DF4 between the density values of the conductor and base, i.e., a height H of the conductor 12 from the base 11 of the inspection work 1 can be obtained, the heights Ho, Hc, and Hp corresponding to the binarization thresholds SH11, SH12, and SH13 can be obtained. The line widths Wo, Wc, and Wp of the conductor 12 at the heights Ho, Hc, and Hp can be measured.

Figure 15B:
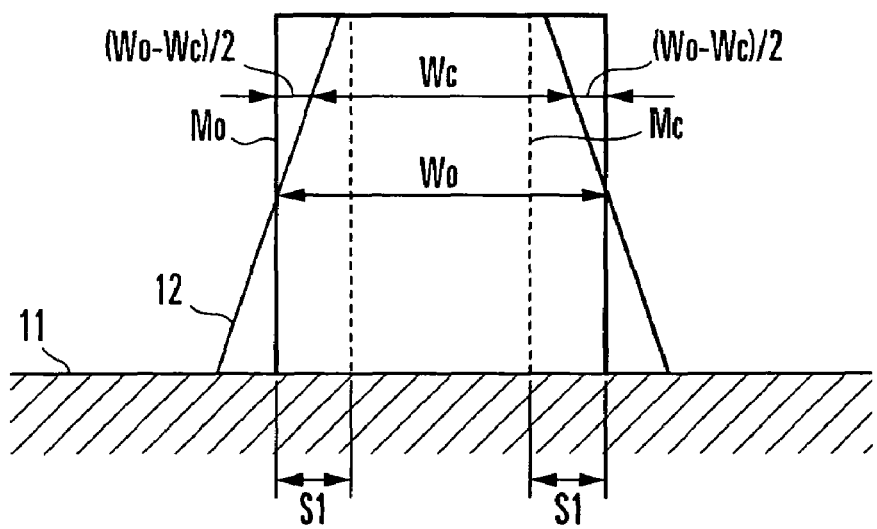

In sensing the inspection work 1 in step S303, the image processing device 4 binarizes continuous tone image data of the sensed pattern to be measured on the basis of the first binarization threshold SH11, and measures the line width Wo of the binarized pattern and a width W1 of the first master pattern Mo. The operator or an illumination light quantity adjustment means (e.g., the host computer 5) adjusts the illumination light quantity of the line sensor camera 3 so as to make Wo and W1 coincide with each other. Continuous tone image data stored in the image memory after adjusting the illumination light quantity and sensing the inspection work 1 again by the image processing device 4 serves as a final pattern to be measured that has been sensed in step S303. For this reason, the width Wo of the pattern binarized at the binarization threshold SH11 after sensing the conductor 12 and the width W1 of the first master pattern Mo coincide with each other (FIG. 15B). A decrease in the line width Wo of the conductor 12 at the height Hc corresponding to the binarization threshold SH12 is (Wo−Wc)/2 [mm] each on the right and left sides of the conductor 12 with respect to the line width Wo of the conductor 12 at the height Ho corresponding to the binarization threshold SH11. Letting ξ [mm/pixel] be the resolution, the decrease (Wo−Wc)/2 is converted into the number of pixels: ((Wo−Wc)/2)/ξ [pixels].

In order to correspond to the binarization threshold SH12, the width of the second master pattern is narrowed by the decrease ((Wo−Wc)/2)/ξ of the conductor 12. In other words, the primary inspection deficit setting value S1 is corrected to S1+((Wo−Wc)/2)/ξ, and the first master pattern Mo is contracted by S1+((Wo−Wc)/2)/ξ each on the right and left sides.

In this way, the host computer 5 corrects the primary inspection deficit setting value S1 (step S309 in FIG. 14), and creates the second master pattern Mc (step S310 in FIG. 14).

Similar to the first embodiment, the host computer 5 expands the first master pattern Mo in a direction perpendicular to the center line, and thereby creates in advance a third master pattern Mp for detecting a projection, scattering, or short circuit (FIG. 8B). The defect detection precision by the third master pattern Mp depends on how much the first master pattern is expanded. If a projection with a primary inspection projection setting value (second inspection threshold) S2 [pixel] or more is to be recognized as a defect, the first master pattern Mo is expanded by S2 each on the right and left sides (when the pattern to be measured is binarized on the basis of the binarization threshold SH11). A projection with the primary inspection projection setting value S2 or more can be detected by AND operation between the binarized pattern and the third master pattern Mp.

Similar to the primary inspection deficit setting value S1, the primary inspection projection setting value S2 is determined on the assumption that the continuous tone image of a pattern to be measured is binarized on the basis of the binarization threshold SH11. The fourth embodiment executes AND operation between the third master pattern Mp and the pattern to be measured that has been binarized on the basis of the binarization threshold SH13. The conductor width increases by a shift of the binarization threshold from SH11 to SH13. The primary inspection projection setting value S2 must be corrected in accordance with such change (the width of the third master pattern Mp must be corrected).

Figure 16:
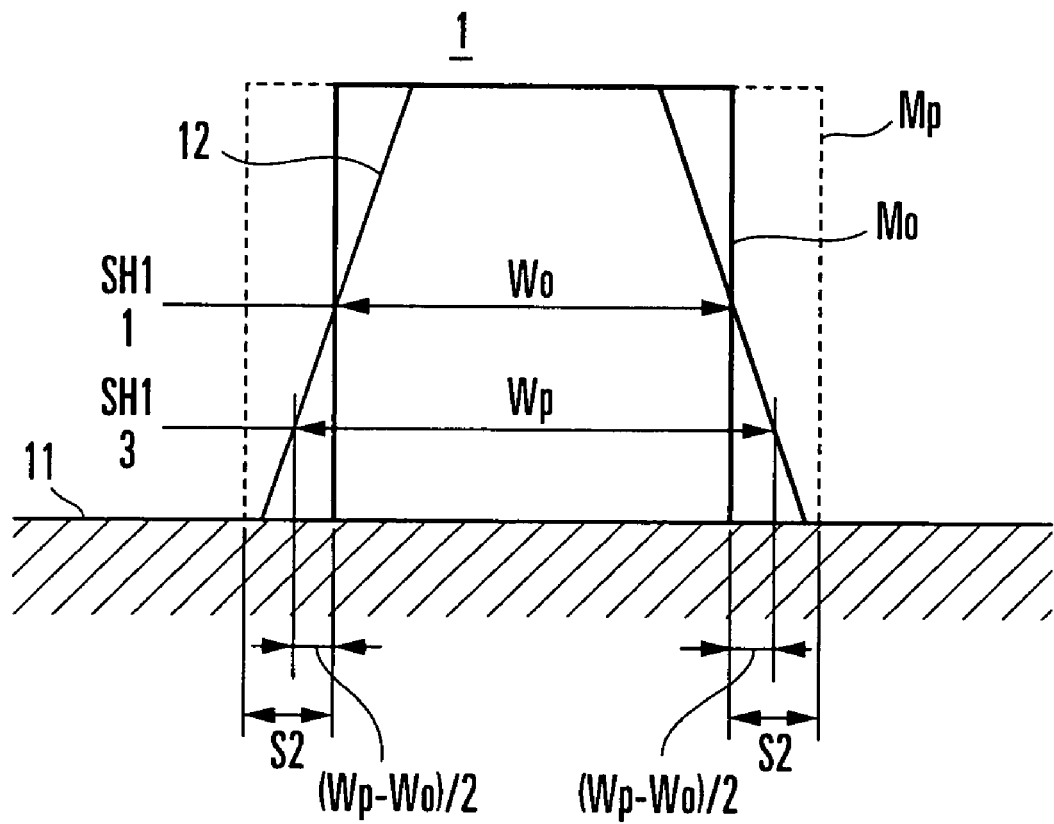
FIG. 16 is a view for explaining a method of correcting a primary inspection projection setting value.
Figure 18A:
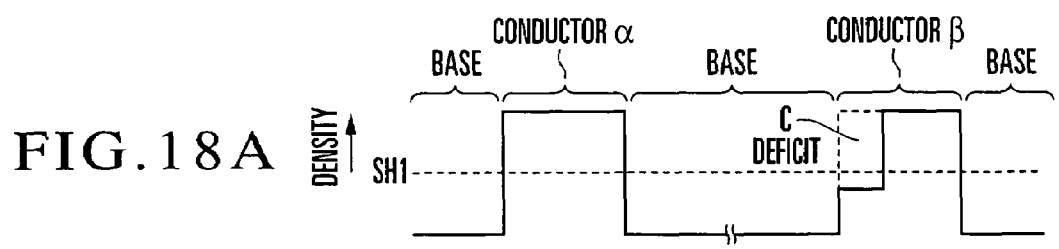
FIGS. 18A to 18F are charts for explaining a problem when density variations exist in continuous tone image data of the pattern to be measured.
Figure 18B:
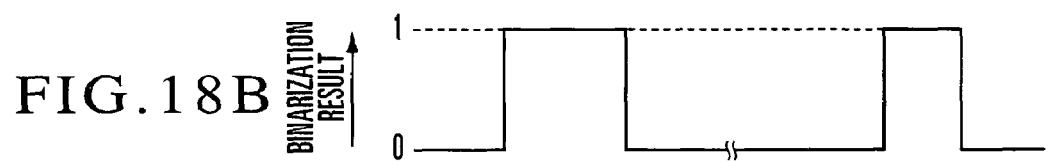
Figure 18C:
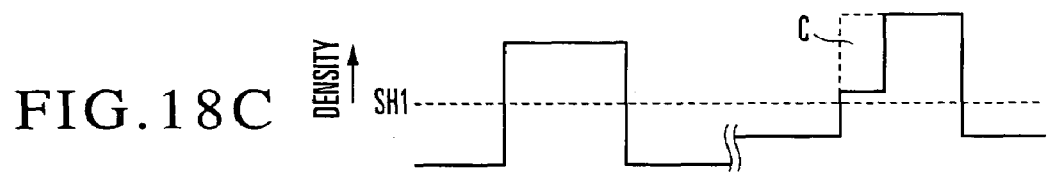
Figure 18D:
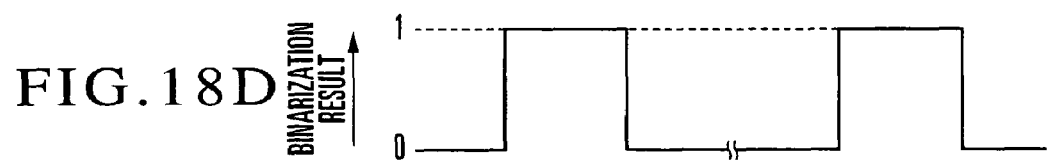
Figure 18E:
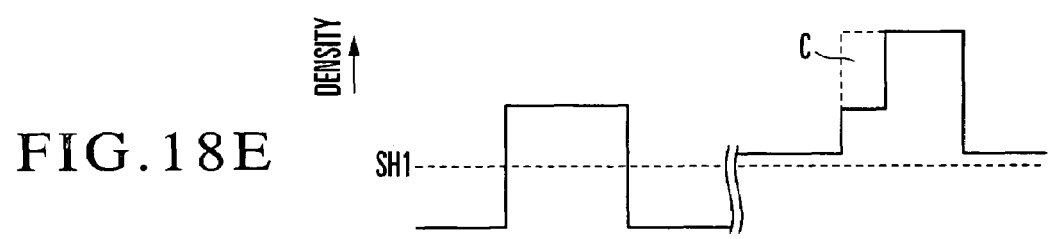
Figure 18F:
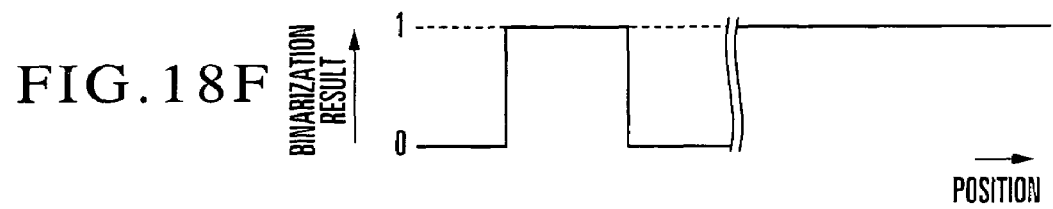

An increase in the line width Wp of the conductor 12 at the height Hp corresponding to the binarization threshold SH13 is (Wp−Wo)/2 [mm] each on the right and left sides of the conductor 12 with respect to the line width Wo of the conductor 12 at the height Ho corresponding to the binarization threshold SH11 (FIG. 16). The increase (Wp−Wo)/2 is converted into the number of pixels: ((Wp−Wo)/2)/ξ [pixels]. In order to correspond to the binarization threshold SH13, the width of the third master pattern Mp is expanded by the increase ((Wp−Wo)/2)/ξ of the conductor 12. In other words, the primary inspection projection setting value S2 is corrected to S2+((Wp−Wo)/2)/ξ, and the first master pattern Mo is increased by S2+((Wo−Wc)/2)/ξ each on the right and left sides. Note that a region which actually serves as the third master pattern Mp is a region having "1" as a result of logically inverting the expansion result, as described above.

In this fashion, the host computer 5 corrects the primary inspection projection setting value S2 (step S311 in FIG. 14), and creates the third master pattern Mp (step S312 in FIG. 14). Since the second and third master patterns Mc and Mp are created by contracting and expanding the first master pattern Mo, the second and third master patterns Mc and Mp and the pattern to be measured need not be aligned again.

The image processing device 4 inspects the pattern to be measured by comparing the binarized pattern and the second and third master patterns Mc and Mp (step S313 in FIG. 14). The image processing device 4 compares the second master pattern Mc and the pattern P which has been binarized on the basis of the binarization threshold SH12. Details of inspection have been described with reference to FIG. 9A. The image processing device 4 compares the binarized pattern P and third master pattern Mp on the basis of the binarization threshold SH13. Details of inspection have been described with reference to FIG. 9B.

After the above-described primary inspection, the image processing device 4 sets the position of a stored defect candidate as address information. The image processing device 4 executes secondary inspection of the pattern to be measured by comparing the pattern with the first master pattern to obtain an error for a region of a predetermined size centered on the defect candidate at the position represented by the address information.

FIG. 17A shows a secondary inspection method of detecting a deficit, and FIG. 17B shows a secondary inspection method of detecting a projection. In FIGS. 17A to 17D, the width W1 of the first master pattern Mo and the line width Wo of the conductor 12 at a height corresponding to the binarization threshold SH11 are equal to each other for descriptive convenience. A secondary inspection deficit setting value (first inspection threshold) S4 [mm] and secondary inspection projection setting value (second inspection threshold) S6 [mm] are set in advance as inspection thresholds of secondary inspection.

For a region of a predetermined size centered on the defect candidate, the image processing device 4 obtains the error amount (deficit amount) between the width W1 of the first master pattern and the width of the pattern to be measured that has been binarized after sensing the conductor 12. A point at which the deficit amount maximizes is defined as the distal end of a deficit C. Letting a [mm] be the maximum error amount, a defect is recognized for a≧S4 (FIG. 17A).

For a region of a predetermined size centered on the defect candidate, the image processing device 4 obtains the error amount (projection amount) between the width W1 of the first master pattern and the width of the pattern to be measured. A point at which the projection amount maximizes is defined as the distal end of a projection K. Letting b [mm] be the maximum error amount, a defect is recognized for b≧S6 (FIG. 17B).

The secondary inspection deficit setting value S4 is determined on the assumption that the continuous tone image of a pattern to be measured is binarized on the basis of the binarization threshold SH11. In the fourth embodiment, the deficit amount is obtained by comparing the first master pattern Mo and the pattern to be measured that has been binarized on the basis of the binarization threshold SH12. Thus, the secondary inspection deficit setting value S4 must be corrected, similar to the primary inspection deficit setting value S1.

FIG. 17C shows a method of correcting the secondary inspection deficit setting value S4. A decrease in the line width Wc of the conductor 12 at a height corresponding to the binarization threshold SH12 is a total of Wo−Wc [mm] on the right and left sides with respect to the line width Wo of the conductor 12 at a height corresponding to the binarization threshold SH11. Since the apparent deficit amount increases by the decrease Wo−Wc of the conductor 12, the secondary inspection deficit setting value S4 is corrected to S4+(Wo−Wc) in order to correspond to the binarization threshold SH12.

Similar to the secondary inspection deficit setting value S4, the secondary inspection projection setting value S6 is determined on the assumption that the continuous tone image of a pattern to be measured is binarized on the basis of the binarization threshold SH11. In the fourth embodiment, the projection amount is obtained by comparing the first master pattern Mo and the pattern to be measured that has been binarized on the basis of the binarization threshold SH13. Hence, the secondary inspection projection setting value S6 must be corrected, similar to the primary inspection projection setting value S2.

FIG. 17D shows a method of correcting the secondary inspection projection setting value S6. An increase in the line width Wp of the conductor 12 at a height corresponding to the binarization threshold SH13 is a total of Wp−Wo [mm] on the right and left sides with respect to the line width Wo of the conductor 12 at a height corresponding to the binarization threshold SH11. Since the apparent projection amount increases by the decrease Wp−Wo of the conductor 12, the secondary inspection projection setting value S6 is corrected to S6+(Wp−Wo) in order to correspond to the binarization threshold SH13.

The host computer 5 corrects the secondary inspection deficit setting value S4 (step S314), and corrects the secondary inspection projection setting value S6 (step S315). The image processing device 4 compares the pattern to be measured and the first master pattern to obtain an error, thus performing secondary inspection of the pattern to be measured (step S316).

According to the fourth embodiment, the first line width Wo of the conductor at the first binarization threshold SH11, the second line width Wc of the conductor at the second binarization threshold SH12, and the third line width Wp of the conductor at the third binarization threshold SH13 are obtained from the inspection work 1. The first inspection threshold (primary inspection deficit setting value S1 and secondary inspection deficit setting value S4) which is set in advance in correspondence with the first binarization threshold SH11 and used to detect a deficit or disconnection is automatically corrected on the basis of the first and second line widths Wo and Wc so as to correspond to the second binarization threshold SH12. The second inspection threshold (primary inspection projection setting value S2 and secondary inspection projection setting value S6) which is set in advance in correspondence with the first binarization threshold SH11 and used to detect a projection or short circuit is automatically corrected on the basis of the first and third line widths Wo and Wp so as to correspond to the third binarization threshold SH13. The operator need not correct the first and second inspection thresholds in consideration of the differences between the second and third line widths Wc and Wp and the first line width Wo. Consequently, the fourth embodiment can automatically eliminate the influence of the sectional shape of the conductor, and can accurately detect a defect of a pattern to be measured.

Fifth Embodiment

In the fourth embodiment, the error amount of a pattern to be measured with respect to the first master pattern is compared with the inspection threshold (secondary inspection deficit setting value S4 and secondary inspection projection setting value S6). Alternatively, the ratio of the error amount and the width of the first master pattern may be compared with the inspection threshold. In this case, a secondary inspection deficit setting value (first inspection threshold) S5 [%] and secondary inspection projection setting value (second inspection threshold) S7 [%] are set in advance as inspection thresholds.

For a region of a predetermined size centered on a defect candidate, an image processing device 4 obtains the error amount (deficit amount) between a width W1 [mm] of the first master pattern and the width of a pattern to be measured that has been binarized after sensing a conductor 12. A point at which the deficit amount maximizes is defined as the distal end of a deficit C. Letting a [mm] be the maximum error amount, a defect is recognized for $a/W1 \geq S5$.

For a region of a predetermined size centered on the defect candidate, the image processing device 4 obtains the error amount (projection amount) between the width W1 [mm] of the first master pattern and the width of the pattern to be measured. A point at which the projection amount maximizes is defined as the distal end of a projection K. Letting b [mm] be the maximum error amount, a defect is recognized for $b/W1 \geq S7$.

Similar to the fourth embodiment, the secondary inspection deficit setting value S5 is determined on the assumption that the continuous tone image of a pattern to be measured is binarized on the basis of the binarization threshold SH11. In the fifth embodiment, the secondary inspection deficit setting value S5 must be corrected because the deficit amount is obtained by comparing the first master pattern and the pattern to be measured that has been binarized on the basis of the binarization threshold SH12. In order to correspond to the binarization threshold SH12, the secondary inspection deficit setting value S5 is corrected to $((S5 \times W1)+(Wo-Wc))/W1$.

Also, the secondary inspection projection setting value S7 is determined on the assumption that the continuous tone image of a pattern to be measured is binarized on the basis of the binarization threshold SH11. In the fifth embodiment, the secondary inspection projection setting value S7 must be corrected because the projection amount is obtained by comparing the first master pattern and the pattern to be measured that has been binarized on the basis of the binarization threshold SH13. In order to correspond to the binarization threshold SH13, the secondary inspection projection setting value S7 is corrected to $((S7 \times W1)+(Wp-Wo))/W1$.

The fifth embodiment can also achieve the same effects as those of the fourth embodiment.

What is claimed is:

1. A pattern inspection method comprising:
the first setting step of setting as a first binarization threshold a value between a density value of a conductor and a density value of a base in a continuous tone image obtained by sensing an inspection work;
the second setting step of setting as a second binarization threshold a value between the density value of the conductor and the first binarization threshold;
the third setting step of setting as a third binarization threshold a value between the first binarization threshold and the density value of the base;
the measurement step of measuring in advance from the inspection work a first line width of the conductor at the first binarization threshold, a second line width of the conductor at the second binarization threshold, and a third line width of the conductor at the third binarization threshold;
the first binarization step of binarizing the continuous tone image on the basis of the second binarization threshold to generate a first pattern to be measured;
the second binarization step of binarizing the continuous tone image on the basis of the third binarization threshold to generate a second pattern to be measured;
the first correction step of correcting, on the basis of the first line width and the second line width, a first inspection threshold which is set in advance in correspondence with the first binarization threshold and used to detect a deficit or disconnection, so as to make the first inspection threshold correspond to the second binarization threshold;

the second correction step of correcting, on the basis of the first line width and the third line width, a second inspection threshold which is set in advance in correspondence with the first binarization threshold and used to detect a projection or short circuit, so as to make the second inspection threshold correspond to the third binarization threshold;

the step of obtaining an error amount between the first pattern to be measured and a master pattern serving as a reference;

the first inspection step of comparing the error amount between the first pattern to be measured and the master pattern with the corrected first inspection threshold;

the step of obtaining an error amount between the second pattern to be measured and the master pattern; and the second inspection step of comparing the error amount between the second pattern to be measured and the master pattern with the corrected second inspection threshold.

2. A method according to claim 1, wherein the master pattern includes a second master pattern which is prepared by contracting a first master pattern serving as a reference by $S1+((Wo-Wc)/2)/\xi$ each on right and left sides and is used to detect a deficit or disconnection, and a third master pattern which is prepared by expanding the first master pattern by $S2+((Wp-Wo)/2)/\xi$ each on the right and left sides and is used to detect a projection or short circuit, the first correction step comprises the step of, letting Wo be the first line width, Wc be the second line width, $\xi$ be an image resolution, and S1 be the first inspection threshold, correcting the first inspection threshold S1 to $S1+((Wo-Wc)/2)/\xi$, the second correction step comprises the step of, letting Wp be the third line width and S2 be the second inspection threshold, correcting the second inspection threshold S2 to $S2+((Wp-Wo)/2)/\xi$, the first inspection step comprises the step of ANDing the first pattern to be measured and the second master pattern, and the second inspection step comprises the step of ANDing the second pattern to be measured and the third master pattern.

3. A method according to claim 1, wherein the first correction step comprises the step of, letting Wo be the first line width, Wc be the second line width, and S4 be the first inspection threshold, correcting the first inspection threshold S4 to $S4+(Wo-Wc)$, the second correction step comprises the step of, letting Wp be the third line width and S6 be the second inspection threshold, correcting the second inspection threshold S6 to $S6+(Wp-Wo)$, the first inspection step comprises the step of comparing with the corrected first inspection threshold a deficit amount of the first pattern to be measured with respect to a width of the master pattern, and the second inspection step comprises the step of comparing with the corrected second inspection threshold a projection amount of the second pattern to be measured with respect to the width of the master pattern.

4. A pattern inspection apparatus which sets as a first binarization threshold a value between a density value of a conductor and a density value of a base in a continuous tone image obtained by sensing an inspection work, sets as a second binarization threshold a value between the density value of the conductor and the first binarization threshold, sets as a third binarization threshold a value between the first binarization threshold and the density value of the base, and detects a defect of a pattern to be measured by comparing with a master pattern serving as a reference a first pattern to be measured that is obtained by binarizing the continuous tone image on the basis of the second binarization threshold and a second pattern to be measured that is obtained by binarizing the continuous tone image on the basis of the third binarization threshold, comprising:

first binarization means for binarizing the continuous tone image on the basis of the second binarization threshold to generate the first pattern to be measured;

second binarization means for binarizing the continuous tone image on the basis of the third binarization threshold to generate the second pattern to be measured;

first correction means for correcting, on the basis of a first line width of the conductor that is obtained in advance from the inspection work at the first binarization threshold and a second line width of the conductor at the second binarization threshold, a first inspection threshold which is set in advance in correspondence with the first binarization threshold and used to detect a deficit or disconnection, so as to make the first inspection threshold correspond to the second binarization threshold;

second correction means for correcting, on the basis of the first line width obtained in advance from the inspection work and a third line width of the conductor at the third binarization threshold, a second inspection threshold which is set in advance in correspondence with the first binarization threshold and used to detect a projection or short circuit, so as to make the second inspection threshold correspond to the third binarization threshold;

first inspection means for comparing with the corrected first inspection threshold an error amount between the first pattern to be measured and the master pattern; and second inspection means for comparing with the corrected second inspection threshold an error amount between the second pattern to be measured and the master pattern.

* * * * *